US012469253B2

(12) United States Patent
Asanuma

(10) Patent No.: US 12,469,253 B2
(45) Date of Patent: Nov. 11, 2025

(54) IMAGE PROCESSING APPARATUS, CONTROL METHOD THEREOF, RECORDING MEDIUM

(71) Applicant: CANON KABUSHIKI KAISHA, Tokyo (JP)

(72) Inventor: Tomoya Asanuma, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 17/714,011

(22) Filed: Apr. 5, 2022

(65) Prior Publication Data
US 2022/0327802 A1    Oct. 13, 2022

(30) Foreign Application Priority Data
Apr. 8, 2021    (JP) .................................. 2021-065654

(51) Int. Cl.
G06V 10/75    (2022.01)
(52) U.S. Cl.
CPC .......... G06V 10/751 (2022.01); G06V 10/757 (2022.01)
(58) Field of Classification Search
None
See application file for complete search history.

(56) References Cited

U.S. PATENT DOCUMENTS

| | | | | |
|---|---|---|---|---|
| 6,577,319 B1* | 6/2003 | Kashiwagi | ............ | G06F 3/0481 345/643 |
| 2005/0082496 A1* | 4/2005 | Bjuggren | .................. | G03F 1/76 250/492.1 |
| 2005/0131857 A1* | 6/2005 | Fujiki | ..................... | G06T 19/00 |
| 2013/0267148 A1* | 10/2013 | Ramavajjala | ......... | B24B 37/005 700/121 |
| 2016/0327605 A1* | 11/2016 | Pandev | .................... | H01L 22/20 |
| 2017/0153608 A1* | 6/2017 | Ueda | .................... | G05B 19/409 |
| 2018/0260669 A1* | 9/2018 | Konishi | ................ | G06T 1/0014 |
| 2019/0187951 A1* | 6/2019 | Saito | ......................... | H04R 3/00 |
| 2021/0407179 A1* | 12/2021 | Nishida | ................. | A63F 13/355 |
| 2022/0171290 A1* | 6/2022 | Onose | ................. | G03F 7/70625 |
| 2022/0327802 A1* | 10/2022 | Asanuma | ............. | G06V 10/757 |

FOREIGN PATENT DOCUMENTS

JP        2018151748 A    9/2018

* cited by examiner

Primary Examiner — Edward Park
(74) Attorney, Agent, or Firm — Canon U.S.A., Inc. IP Division

(57) ABSTRACT

An image processing apparatus acquires a captured image, sets a plurality of parameters for generating a matching model, generates a matching model for detecting a target object based on the acquired captured image and the set plurality of parameters, and identifies an item of a common parameter for common use by a plurality of target objects and an item of an individual parameter to be determined for each of the plurality of target objects from the plurality of parameters in a case where the plurality of parameters is set and a plurality of matching models is generated for each of the plurality of target objects.

8 Claims, 21 Drawing Sheets

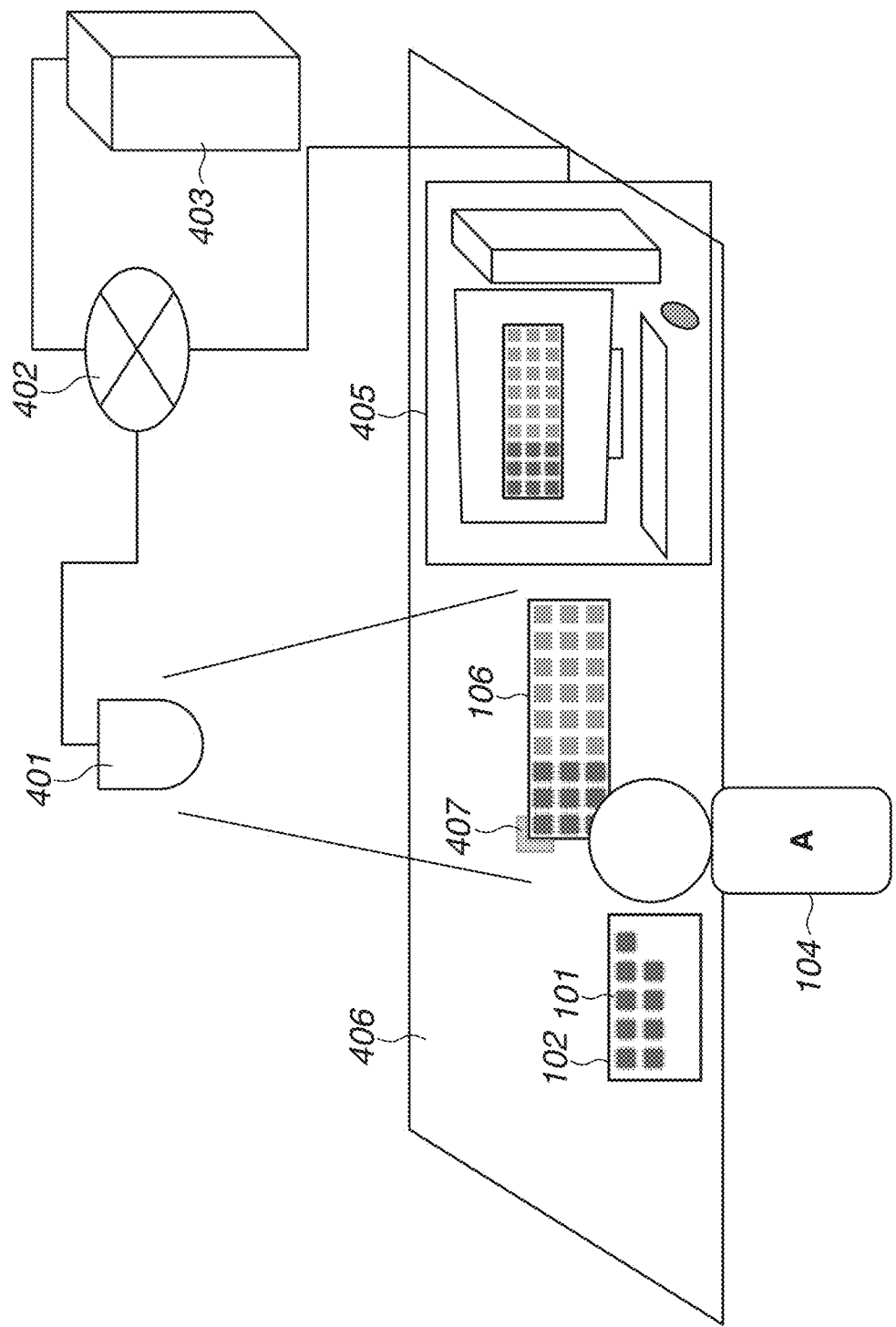

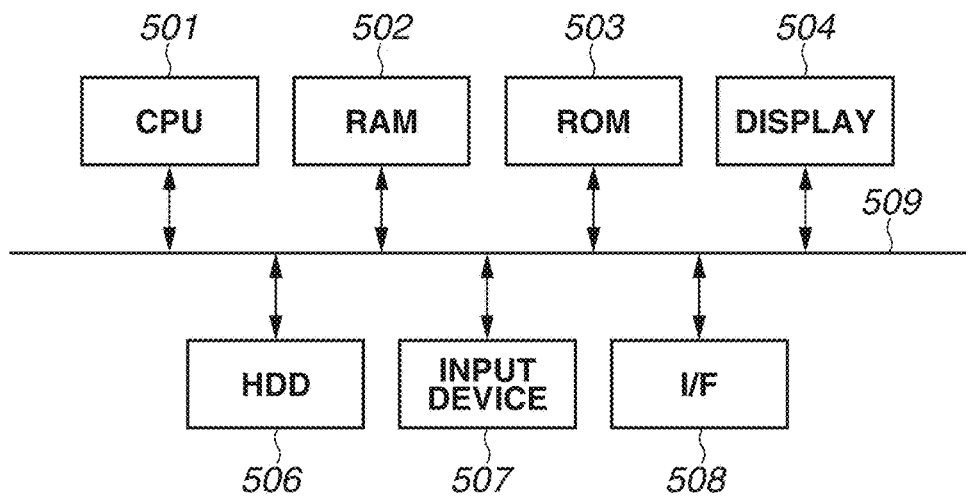
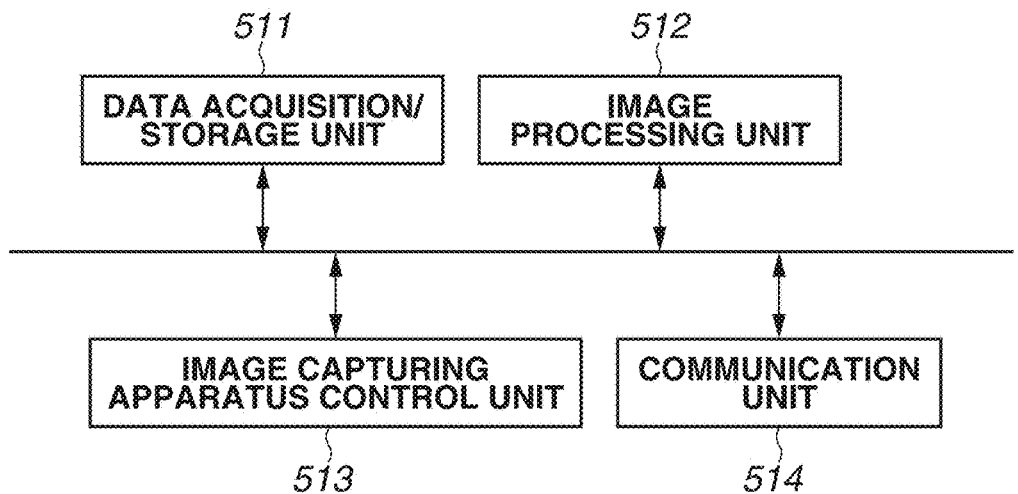
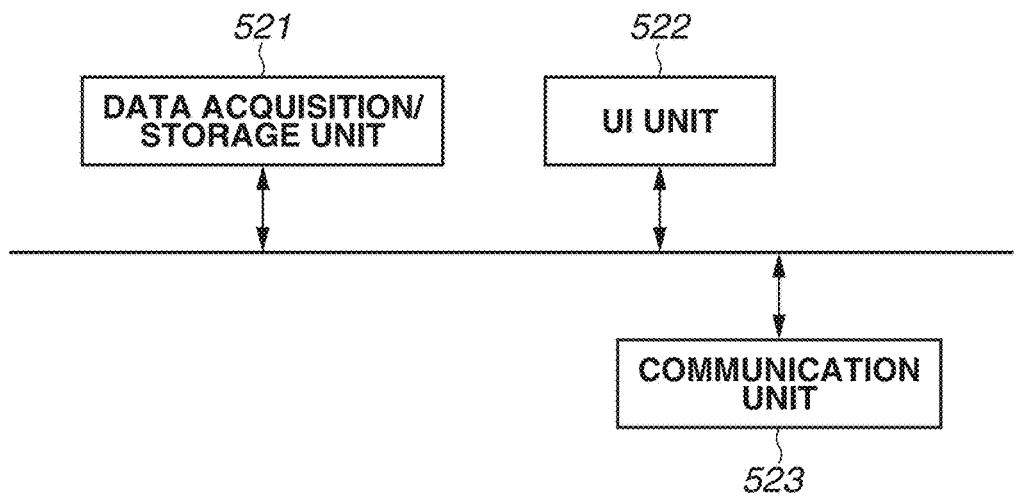

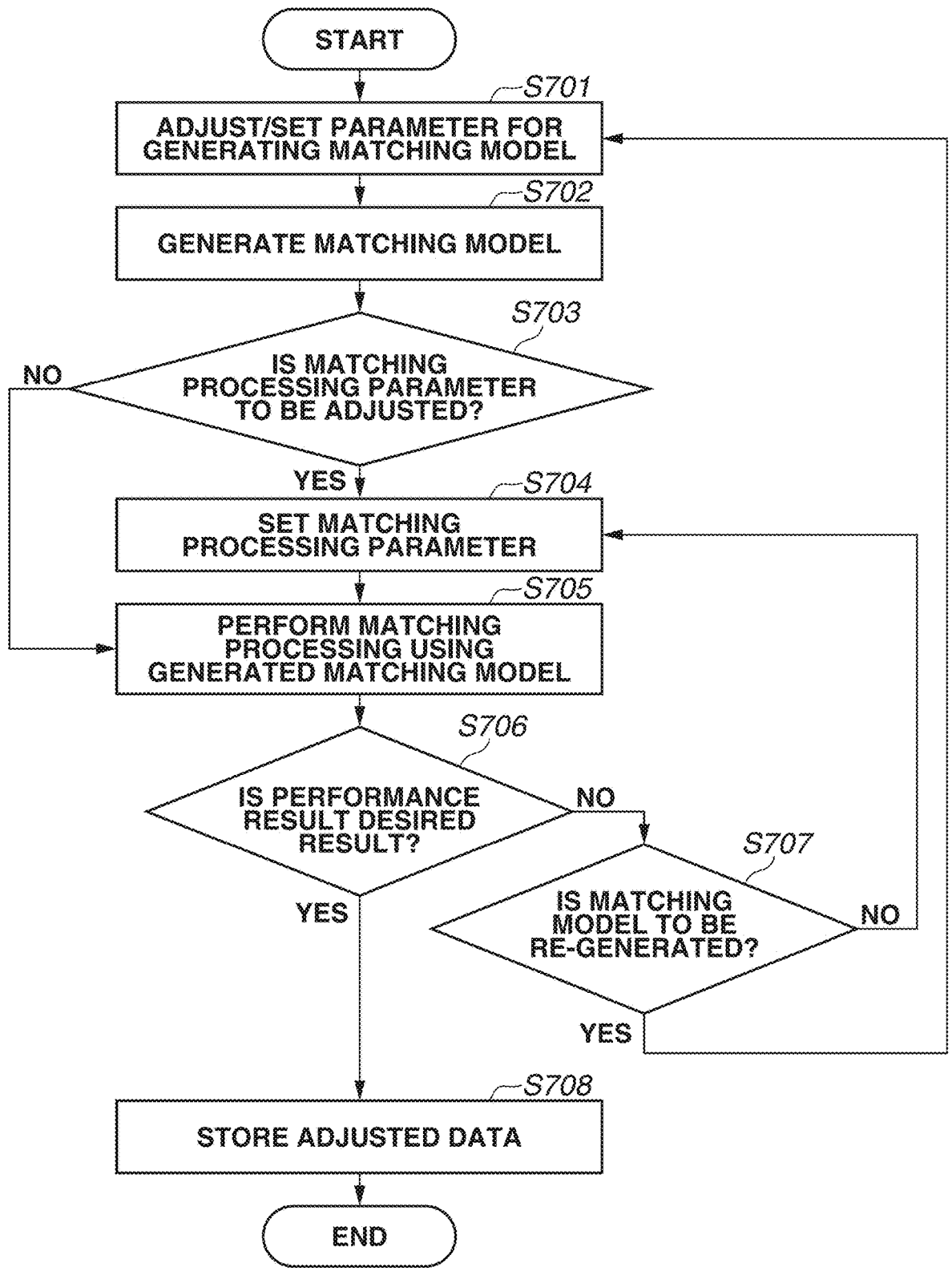

IMAGE PROCESSING APPARATUS, CONTROL METHOD THEREOF, RECORDING MEDIUM

BACKGROUND

Field of the Disclosure

The present disclosure relates to a technique for generating a matching model.

Description of the Related Art

Techniques are known for generating a standard template corresponding to an object and a recognition template representing a difference from the standard template and then performing template matching using the standard template and the recognition template in object recognition, as discussed in Japanese Patent Application Laid-Open No. 2018-151748.

Japanese Patent Application Laid-Open No. 2018-151748 discusses a method for increasing the speed of matching processing in object recognition using template matching but does not discuss a method for adjusting an item set for a plurality of target objects for which a model is to be generated.

For example, in a case where the total number of a plurality of fine workpieces or whether orientations of the workpieces are correct are to be checked by image processing, there may be a great variety of types of workpieces. The workpieces may thus be similar in shape or shading to each other but different in size from each other. In this case, it is often difficult to prepare by generating a single matching model or several matching models in advance. Furthermore, generating matching models corresponding to all types of workpieces in advance necessitates a significant number of processes. Even if matching models are generated, it is unrealistic for an operator to select a matching model for each of several thousand IC chips during matching processing.

SUMMARY

Some embodiments of the present disclosure generate a suitable matching model and perform matching processing each time the image processing is performed. And some embodiments of the present disclosure relate to a method for generating a matching model corresponding to a type of a matching target (e.g., integrated circuit (IC) chips as an example of a workpiece in exemplary embodiments below) while reducing a load on an operator in generating the matching model.

According to an aspect of the present disclosure, an image processing apparatus includes an acquisition unit configured to acquire a captured image, a setting unit configured to set a plurality of parameters for generating a matching model, a generation unit configured to generate a matching model for detecting a target object based on the captured image acquired by the acquisition unit and the plurality of parameters set by the setting unit, and an identification unit configured to identify an item of a common parameter for common use by a plurality of target objects and an item of an individual parameter to be determined for each of the plurality of target objects from the plurality of parameters in a case where the plurality of parameters is set and a plurality of matching models is generated for each of the plurality of target objects. The setting unit sets the individual parameter in generating the matching model. The generation unit generates the matching model based on the common parameter stored in advance and the individual parameter set by the setting unit.

Further features of the present disclosure will become apparent from the following description of exemplary embodiments with reference to the attached drawings.

BRIEF DESCRIPTION OF THE DRAWINGS

FIG. 4 is a diagram illustrating a system configuration according to a first exemplary embodiment.

FIGS. 5A to 5C are block diagrams illustrating hardware and software configurations according to the first exemplary embodiment.

FIG. 7 is a flowchart illustrating a process of setting image processing settings according to the first exemplary embodiment.

DESCRIPTION OF THE EMBODIMENTS

Various exemplary embodiments of the present disclosure will be described below with reference to the drawings. It should be noted that each component described in the exemplary embodiments below is a mere example and that the scope of every embodiment is not limited to those described herein.

According to a first exemplary embodiment, integrated circuit (IC) chips that are a type of workpiece in production lines will be described below as an example of a target object to be a matching target for detection and recognition. An image processing apparatus will be described below that is configured to generate a matching model for a workpiece type while reducing a matching model generation load in a use case where matching processing is to be performed on a large amount of workpieces that are similar to each other yet different from each other according to the present exemplary embodiment.

Figure 1:
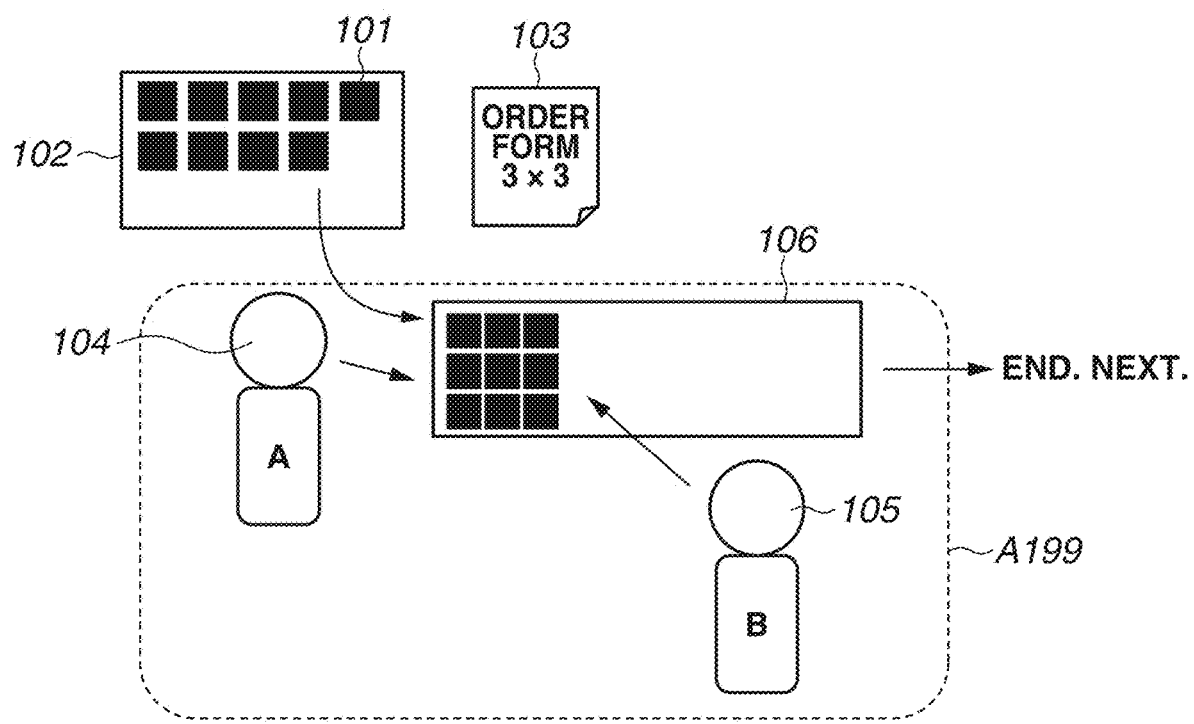
FIG. 1 is a diagram illustrating an integrated circuit (IC) chip repacking operation according to an aspect of the present disclosure.

FIG. 1 is a diagram illustrating an operation environment to which the present exemplary embodiment is applied and an overview of a flow of the operation.

Figure 2:
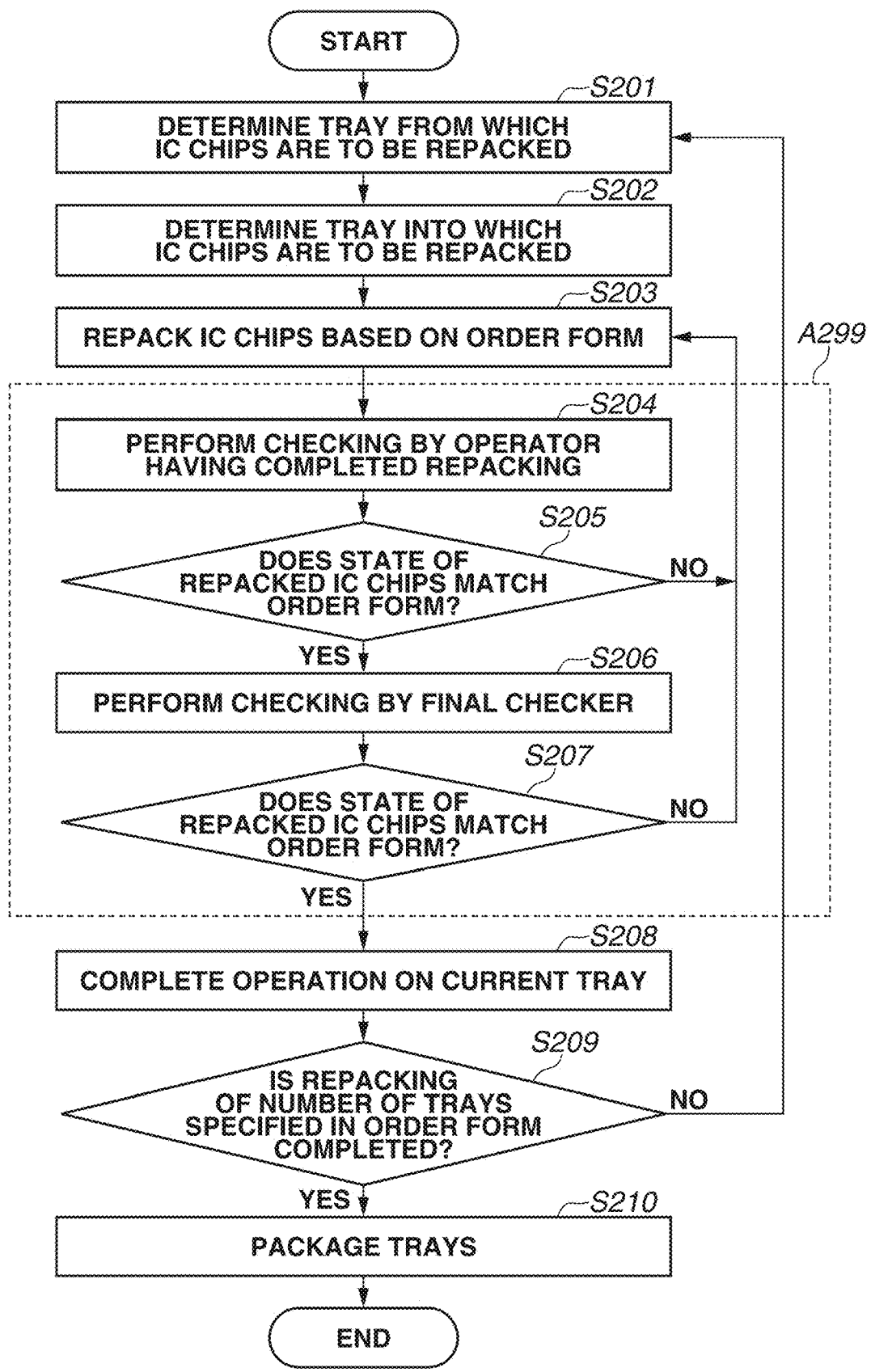
FIG. 2 is flowchart illustrating an IC chip repacking operation according to an aspect of the present disclosure.

FIG. 2 is a flowchart illustrating the operation. In an example of the operation environment, a case is expected where IC chips 101 are delivered in a state of being packed in an IC chip tray 102. After the delivery, the illustrated operation is an operation of repacking the IC chips 101 into another IC chip tray 106 based on an order form 103. In S201, an operator A 104 of the operation brings the IC chip tray 102 containing the IC chips 101. In S202, the operator A 104 then prepares the IC chip tray 106 into which the IC chips 101 are to be repacked.

At this time, the prepared IC chip tray 106 contains no IC chips. In other words, an empty IC chip tray is prepared. In S203, the operator A 104 repacks the IC chips 101 based on the order form 103. In the repacking, how many IC chips 101 are to be repacked and how the IC chips 101 are to be arranged (e.g., the number of rows and columns) are determined based on the order form 103. In S204, after completing the repacking of the IC chips 101 based on the order form 103, the operator A 104 checks whether the state of the IC chips 101 repacked in the IC chip tray 106 matches the description in the order form 103. In S205, in a case where the operator A 104 after the checking determines that the state of the IC chips 101 repacked in the IC chip tray 106 matches the description in the order form 103 (YES in S205), the operator A 104 requests an operation leader B 105 to check the state for double-check. In S206, the operation leader B 105 checks whether the repacking of the IC chips 101 by the operator A 104 is correctly performed. In S207, in a case where the operation leader B 105 determines that the state of the IC chips 101 repacked in the IC chip tray 106 does not match the description in the order form 103 (NO in S207), the operation leader B 105 requests the operator A 104 to correct the repacked IC chips 101 and then recheck the corrected IC chips 101. In contrast, in a case where the operation leader B 105 determines that the IC chip tray 106 after the repacking is in a correct state (YES in S207), the processing proceeds to S208. In S208, the operation on the IC chip tray 106 is completed. In S209, the order form 103 is checked, and the foregoing operation is repeated the number of times corresponding to the number of IC chip trays that is specified in the order form 103. In a case where the repacking operation specified in the order form 103 is completed (YES in S209), the processing proceeds to S210. In S210, the IC chip trays 106 in the quantity specified in the order form 103 are packaged.

An example of an operation environment has been described above, and the present exemplary embodiment is applied to an operation in the environment. The operation is specifically an operation included in areas A199 and A299 in FIGS. 1 and 2, respectively. This operation is an operation of checking whether the number and arrangement of IC chips are as specified in an order form, and the operation of visual checking by human eyes as described above (area A299) is replaceable with a determination process based on images captured by an image capturing apparatus (e.g., network camera).

Figure 3:
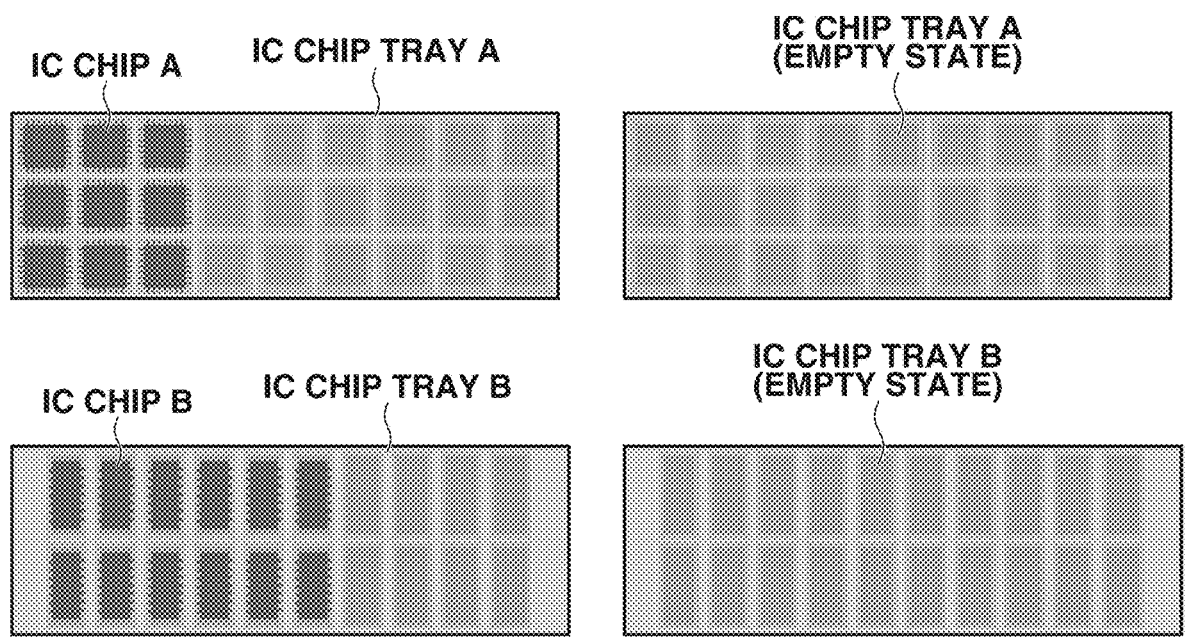
FIG. 3 is a diagram illustrating processing targets and workpieces according to an aspect of the present disclosure.

FIG. 3 is a diagram illustrating types of IC chips as an image processing target and types of IC chip trays for storing the IC chips according to the present exemplary embodiment. The types of IC chips and IC chip trays vary over a wide range. The operation of repacking IC chips into IC chip trays is performed on various IC chips and various IC chip trays. There are also cases where different IC chips are repacked into the same IC chip tray. In other words, determining IC chip trays uniquely does not always lead to a unique determination of IC chips.

The image processing according to the present exemplary embodiment is to check whether the total number and orientations of all packed IC chips are correct. However, since there are various types of IC chips, there may arise a situation where IC chips are similar in shape or shading to each other but different in size from each other, and it is difficult to respond to this situation by generating a single matching model or several types of matching models in advance. Even if matching models corresponding to all IC chips can be generated in advance, the generating necessitates a significant number of processes, and it is unrealistic for an operator to select a matching model for each of several thousand IC chips during matching processing. In other words, each time the image processing is performed, desirably a suitable matching model is generated and the matching processing is performed.

The present exemplary embodiment relates to a process for generating a suitable matching model each time the matching processing is performed and relates to a method for generating a matching model corresponding to a type of a workpiece (e.g., IC chip in the present exemplary embodiment) while reducing a load on an operator in generating the matching model.

<System Configuration>

FIG. 4 is a diagram illustrating an entire configuration of an image processing system. The system according to the present exemplary embodiment includes apparatuses that perform the following processing.

The image processing system according to the present exemplary embodiment is a system that captures images of articles delivered to a factory and that inspects and checks whether the number and orientations of the articles are correct. While an example will be described below where the image processing system according to the present exemplary embodiment inspects and checks a plurality of IC chips packed in IC chip trays, targets to be inspected and checked are not limited to IC chips.

The image processing system includes an image processing apparatus 403, an image capturing apparatus 401 (e.g., a network (NW) camera), and an operation terminal 405. The image processing apparatus 403, the image capturing apparatus 401, and the operation terminal 405 communicate with each other via a network 402. The image processing apparatus 403 connects to the image capturing apparatus 401 via the network 402, and controls image capturing performed by the image capturing apparatus 401.

The image capturing apparatus 401 is situated to capture images of an IC chip tray 106 containing IC chips and captures images of the IC chip tray 106 under control by the image processing apparatus 403. IC chips packed in a delivered IC chip tray 102 are arranged in the empty IC chip tray 106 based on an order form. After an operator 104 completes the IC chip arrangement, the image capturing apparatus 401 images the IC chip tray 106 and obtains captured images. The image processing apparatus 403 performs matching processing on the plurality of IC chips packed in the IC chip tray 106 using a model of a single IC chip based on the captured images. By the foregoing process, the number and orientations of the IC chips packed in the IC chip tray 106 are inspected.

<Hardware Configuration>

FIG. 5A is a block diagram illustrating a hardware configuration of the image processing apparatus 403 and the operation terminal 405.

The image processing apparatus 403 is configured as a computer apparatus including a central processing unit (CPU) 501, a read-only memory (ROM) 503, a random access memory (RAM) 502, a hard disk drive (HDD) 506, an input device 507, a display 504, an interface (I/F) 508, and a bus 509. The CPU 501 processes programs. The ROM 503 stores programs. Data for executing a program is loaded into the RAM 502. The HDD 506 stores data. The input device 507 and the display 504 are used in issuing control instructions to the programs and in registering settings information. The I/F 508 communicates with external systems.

The functions of the image processing apparatus 403 and the operation terminal 405 are realized by reading a predetermined program on hardware, such as the CPU 501 or the ROM 503 storing the programs, so that the CPU 501 controls the units of the image processing apparatus 403 and the operation terminal 405 and realizes various types of processing. The hardware configuration described above and a software configuration described below are mere examples, and configurations are not necessarily limited to those described herein according to the present exemplary embodiment. For example, a plurality of pieces of hardware can cooperate together to function as a single unit, or a single piece of hardware can function as a plurality of units.

<Software Configuration>

FIG. 5B is a block diagram illustrating a software configuration of the image processing apparatus 403.

The software configuration of the image processing apparatus 403 includes processing modules, such as a communication unit 514, a data acquisition/storage unit 511, an image processing unit 512, and an image capturing apparatus control unit 513.

The communication unit 514 receives requests from the other processing modules and performs processing, such as data transmission and reception to and from external systems (e.g., transmission and reception of control commands to and from external devices).

The data acquisition/storage unit 511 stores data acquired through communication. The data acquisition/storage unit 511 also provides and transmits the stored data based on requests from the other processing units. The data acquisition/storage unit 511 further sorts information about the stored data (e.g., data that matches a specific condition or data that is extracted based on a specific condition) and provides the data to the other processing units.

The image processing unit 512 performs image processing based on requests from external systems. Results of the image processing performed by the image processing unit 512 are stored in the data acquisition/storage unit 511. The image processing unit 512 also performs model generation processing relating to matching that is a type of the image processing. Matching model data generated by the image processing unit 512 is stored in the data acquisition/storage unit 511.

The image capturing apparatus control unit 513 performs processing to be ready to communicate with the image capturing apparatus 401 connected to the image processing apparatus 403 via the communication unit 514. After the image processing apparatus 403 and the image capturing apparatus 401 become communicable with each other, the image capturing apparatus control unit 513 acquires settings data from the image capturing apparatus 401 or performs processing to change image capturing parameters. After setting a desired image capturing parameter to the image capturing apparatus 401, the image capturing apparatus control unit 513 transmits an image capturing command to the image capturing apparatus 401 via the communication unit 514, so that the image capturing apparatus 401 performs image capturing processing. Image data captured through the image capturing processing is received by the image capturing apparatus control unit 513 from the image capturing apparatus 401 via the communication unit 514 and stored in the data acquisition/storage unit 511 as needed.

The image processing unit 512 performs image processing using image data captured by the image capturing apparatus control unit 513 as input.

Details of the image processing performed by the image processing unit 512 and the image capturing apparatus control unit 513 and setting processing for performing the image processing will be described below.

FIG. 5C is a block diagram illustrating a software configuration of the operation terminal 405.

The operation terminal 405 transmits a request to perform desired image processing to the image processing apparatus 403, receives a result of the request, and displays the received result in a form that can be checked by an operator performing operations using the system. The software configuration of the operation terminal 405 includes processing modules, such as a communication unit 523, a data acquisition/storage unit 521, and a user interface (UI) unit 522.

The communication unit 523 performs data transmission and reception to and from external systems (e.g., transmission of a command of a request to perform image processing to the image processing apparatus 403).

The data acquisition/storage unit 521 performs data storage processing. The data acquisition/storage unit 521 also provides and transmits the stored data based on requests from the other processing units.

The data acquisition/storage unit 521 sorts information about the stored data (e.g., data that matches a specific condition or data that is extracted based on a specific condition) and provides the data to the other processing units.

The UI unit 522 performs display processing for setting and executing the image processing corresponding to an operation to be performed by an operator.

Details of a process of causing the image processing apparatus 403 to perform desired image processing from the operation terminal 405 will be described below.

<Sequence of Setting Process (Image Capturing Process)>

Figure 6:
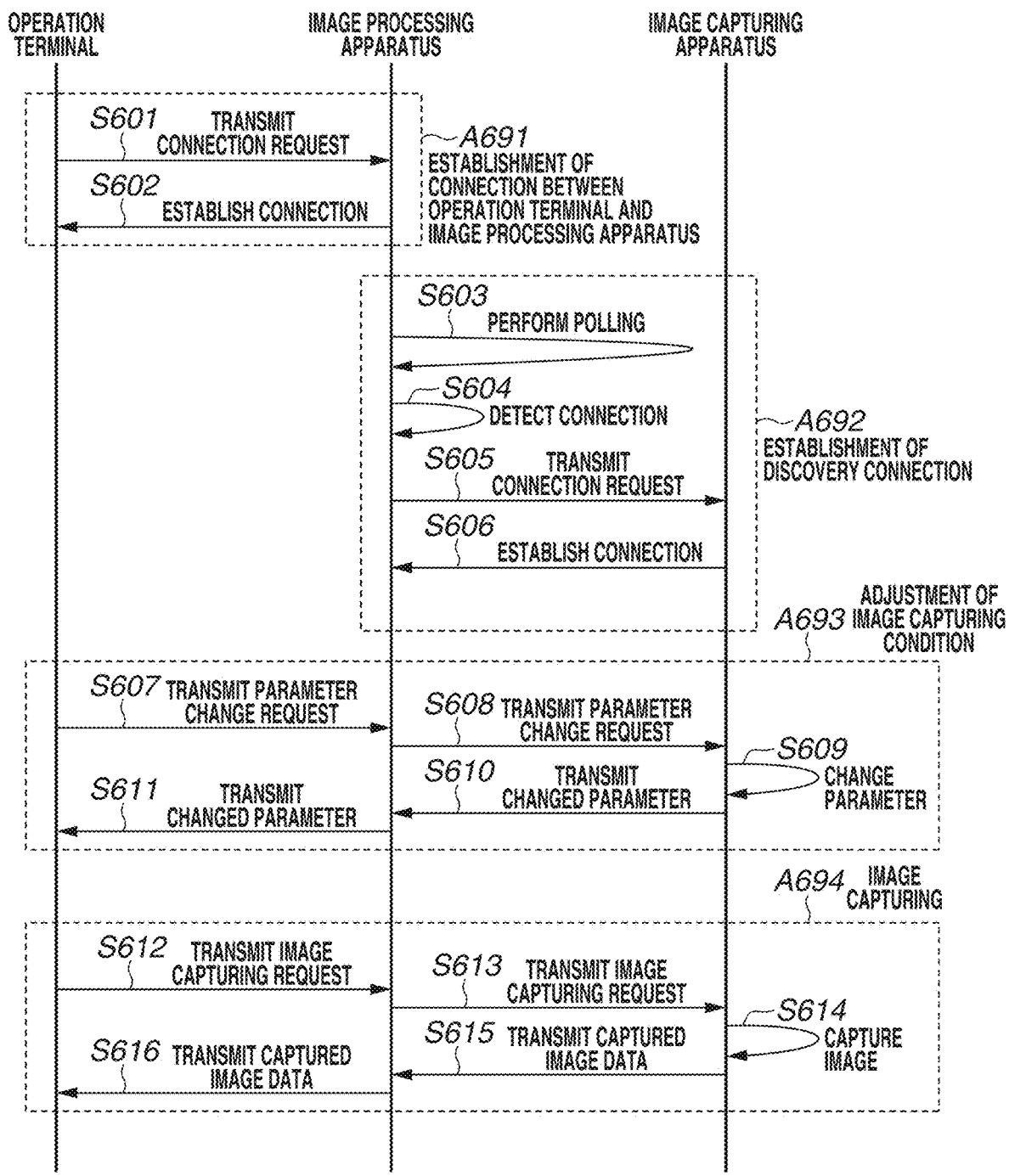
FIG. 6 is a sequence diagram illustrating an image capturing process according to the first exemplary embodiment.

FIG. 6 is a sequence diagram illustrating an image capturing process according to the present exemplary embodiment.

An area A691 corresponds to a process of a connection between the operation terminal 405 and the image processing apparatus 403.

The operation terminal 405 and the image processing apparatus 403 need to be recognizable to each other and connected to each other in order for the operation terminal 405 to transmit various processing requests to the image processing apparatus 403 and for the image processing apparatus 403 to transmit processing results to the operation terminal 405 in response to the requests.

In S601, the operation terminal 405 transmits a connection request to the image processing apparatus 403. In S602, the image processing apparatus 403 establishes a connection with the operation terminal 405.

For example, the operation terminal 405 and the image processing apparatus 403 connect to each other via Hypertext Transport Protocol (HTTP) communication and establish a connection. A method using HTTP communication herein is not limited.

An area A692 corresponds to a process of establishing a connection with the image capturing apparatus 401 controlled by the image processing apparatus 403.

In S603, the image processing apparatus 403 performs polling on the network 402 to check repeatedly whether the image capturing apparatus 401 is connected to the network 402.

In S604, a connection of the image capturing apparatus 401 to the network 402 is detected.

In S605, the image processing apparatus 403 transmits a connection request to the image capturing apparatus 401. In S606, the image capturing apparatus 401 establishes a connection with the image processing apparatus 403 and transmits a connection completion notification.

An area A693 corresponds to a process of adjusting and setting an image capturing condition for the image capturing apparatus 401.

In S607 and S608, the operation terminal 405 transmits an image capturing parameter change request to the image capturing apparatus 401 via the image processing apparatus 403. In S609, the image capturing apparatus 401 performs processing to change an image capturing parameter based on the received image capturing parameter change request. In a case where the image capturing parameter change request is abnormal (e.g., a value to which the parameter is requested to be changed is outside a range), an error is returned. In S610 and S611, after normally completing the parameter changing processing based on the received image capturing parameter change request, the image capturing apparatus 401 transmits a change completion notification together with the changed parameter value to the operation terminal 405 via the image processing apparatus 403.

An area 694 corresponds to a process of image capturing by the image capturing apparatus 401.

After the adjustment of the image capturing condition is completed as a result of the process of adjusting and setting the image capturing condition for the image capturing apparatus 401 in S607 to S611, in S612 and S613, the operation terminal 405 transmits an image capturing request to the image capturing apparatus 401 via the image processing apparatus 403. In S614, the image capturing apparatus 401 receives the image capturing request from the image processing apparatus 403 and performs image capturing. In S615 and S616, the image capturing apparatus 401 transmits captured data to the operation terminal 405 via the image processing apparatus 403.

<Flowchart of Setting Process of Image Processing>

FIG. 7 is a flowchart illustrating a setting process of image processing according to the present exemplary embodiment.

In S701, the image processing apparatus 403 sets a parameter for generating matching models based on a request from the operation terminal 405. In S702, the image processing apparatus 403 generates a matching model based on the request from the operation terminal 405. Details of the matching model generation processing in S701 and S702 will be described below. In S704 (YES in S703), the image processing apparatus 403 sets a parameter for performing matching processing based on the request from the operation terminal 405 using the matching model generated in S702 described above. Since this is the first time to perform the setting processing, it is determined in S703 that the parameter for matching processing is to be adjusted (YES in S703). In a case where a matching result is not a desired result as described below, whether to re-adjust the parameter for matching processing (whether YES or NO in S703) is determined by a user based on the matching result. In S705, the image processing apparatus 403 performs matching processing based on the request from the operation terminal 405. Details of the matching processing performed in S704 and S705 will be described below. In a case where the performance result is a desired result (YES in S706), the processing proceeds to S708. In S708, the image processing apparatus 403 stores various types of information in the data acquisition/storage unit 511 based on the request from the operation terminal 405. Specifically, the parameter for generating matching models (that is set in S701), the parameter for performing matching processing (that is set in S704), and the matching model (that is generated in S702) are stored.

In a case where the performance result is not a desired result (NO in S706) and where it is determined that the process is to be performed again from the matching model generation in S707 (YES in S707), the processing returns to S701 to be performed again. After a matching model is generated in S702, and in a case where it is determined that the parameter for matching processing is to be set again (YES in S703), S704 is performed again. In a case where the parameter for matching processing is to be used without adjustment (NO in S703), the processing proceeds to S705. In S705, the matching processing is performed using the new generated matching model.

Further, in a case where the performance result is not a desired result (NO in S706) and where the matching model generation is not to be performed (NO in S707), the processing proceeds to S704. In S704, the parameter for performing matching processing is set and adjusted again. The subsequent process is as described above, and the matching model generation and adjustment and the matching processing performance and adjustment are repeated until a desired matching performance result is obtained.

<Sequence of Matching Model Generation and Matching Processing>

Figure 8A:
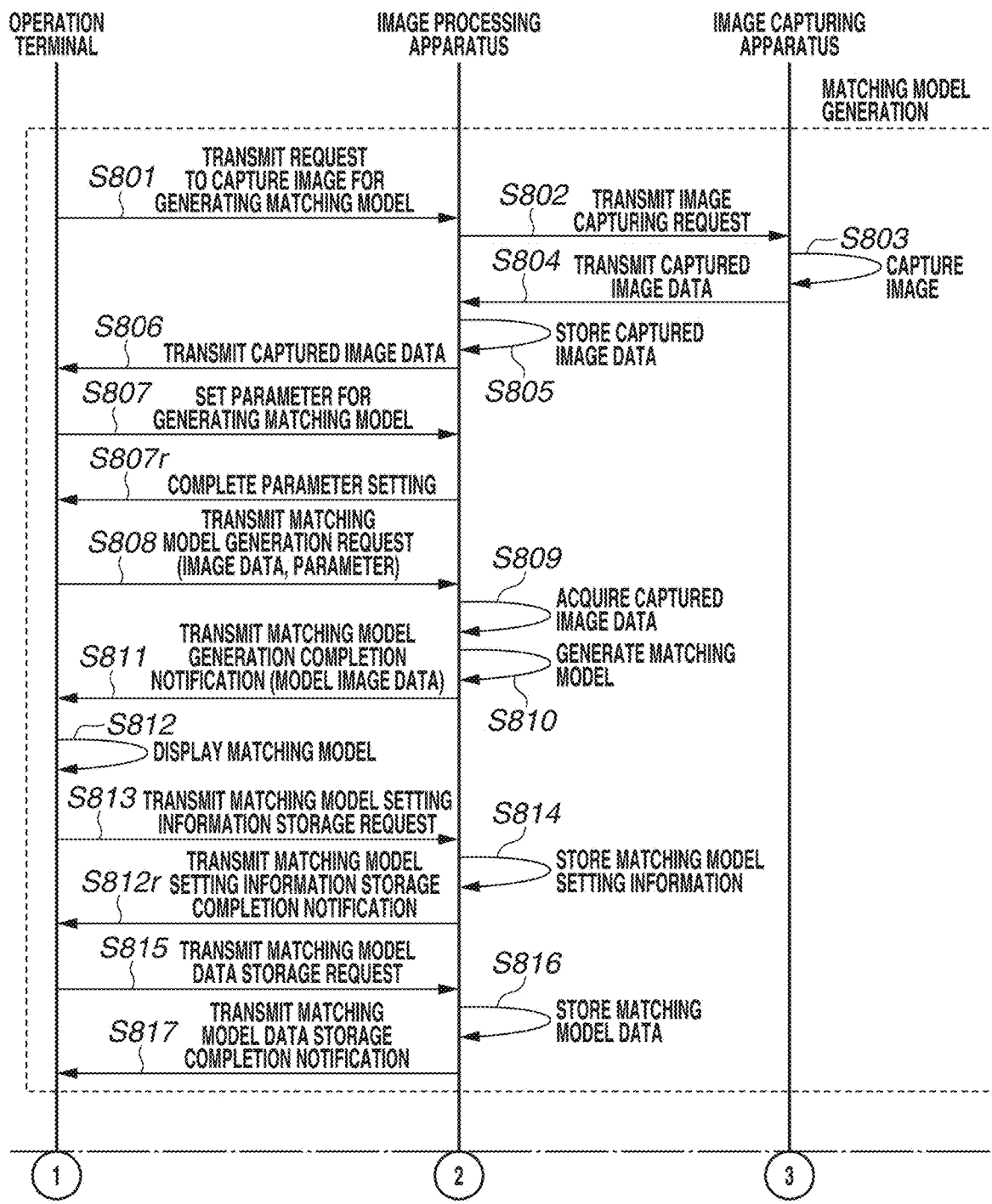
FIGS. 8A and 8B are a sequence diagram illustrating a process of image processing settings according to the first exemplary embodiment.
Figure 8B:
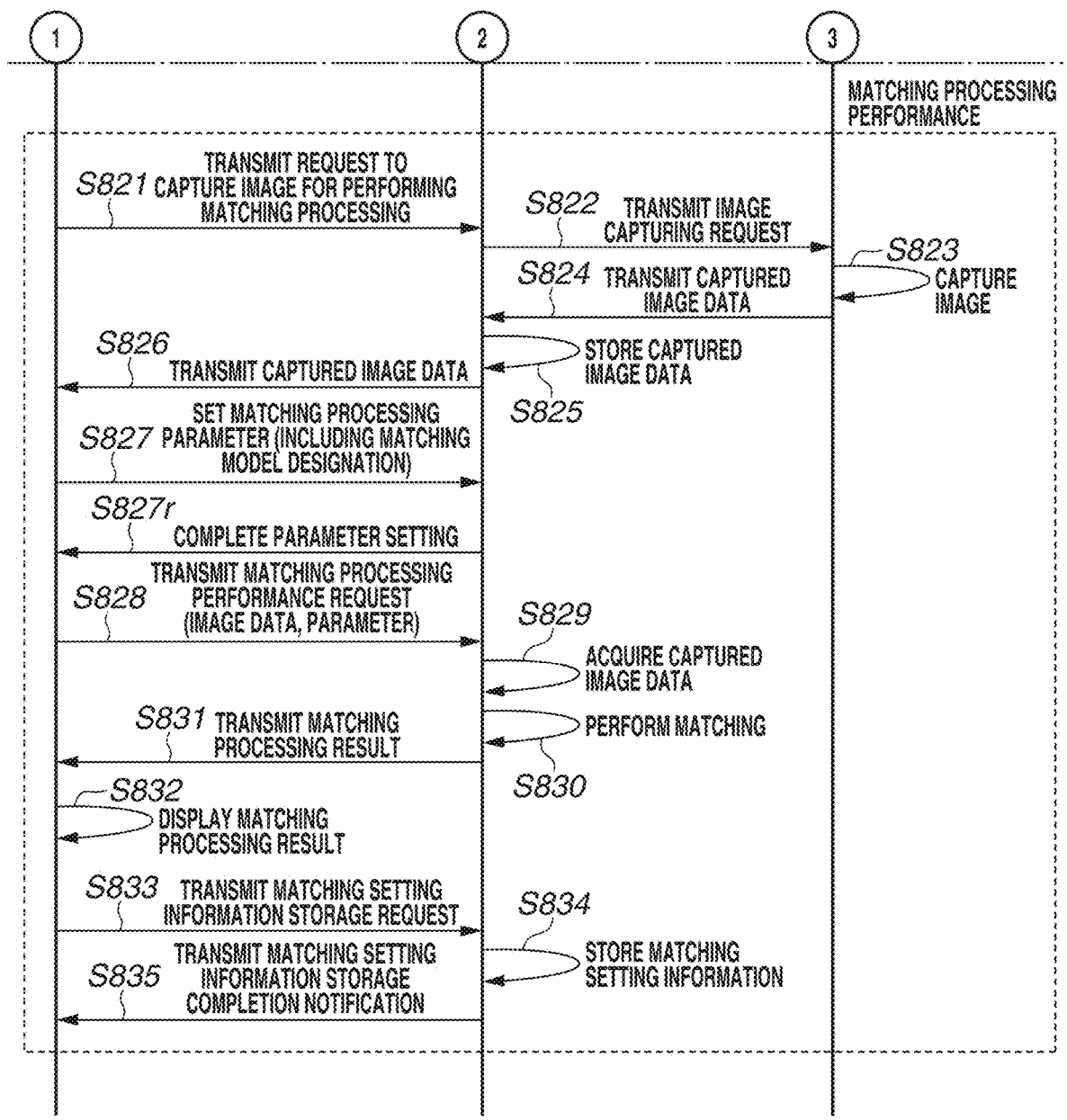

The process of generating a matching model (S701, S702) and the process of performing matching processing (S704, S705) described above with reference to FIG. 7 will be described in more detail below with reference to a sequence diagram illustrated in FIGS. 8A and 8B.

The process of generating a matching model will now be described.

In S801 to S806, the operation terminal 405 first causes a connected image capturing apparatus 401 to perform image capturing. Details of the image capturing are as described above (S612 to S616).

In S807, the operation terminal 405 sets the parameter for generating matching models that is to be applied to the acquired captured image data to generate a matching model. Each time the parameter for generating matching models is set, a state of a generated matching model is displayed for checking on the operation terminal 405, and the parameter setting is performed to generate a desired matching model while an adjustment level is checked.

In S808, after the adjustment of the parameter for generating matching models is completed, the operation terminal 405 transmits a matching model generation request to generate a matching model to the image processing apparatus 403.

In S809, the image processing apparatus 403 receives the matching model generation request from the operation terminal 405 and acquires the captured image data stored in S805. In S810, the image processing apparatus 403 generates a matching model. In S811, the image processing apparatus 403 transmits a matching model generation completion notification to the operation terminal 405. In S812, the operation terminal 405 acquires the generated matching model based on the matching model generation completion notification data transmitted from the image processing apparatus 403 and displays the acquired matching model in a checkable form. At this time, in S813 to S816, the image processing apparatus 403 stores the generated matching model data and the parameter data for generating matching models in the data acquisition/storage unit 511.

The process of performing matching will now be described.

In S821 to S826, the operation terminal 405 first transmits an image capturing request to the connected image capturing apparatus 401. Details of the image capturing are as described above (S612 to S616).

In S827, the operation terminal 405 sets a parameter to be applied to the acquired captured image data for performing matching processing. In S828, in order to set a parameter for performing matching processing and to check a matching level, the operator 104 transmits a request to perform matching processing to the image processing apparatus 403 using the operation terminal 405.

In S829, the image processing apparatus 403 receives the request to perform matching processing from the operation terminal 405 and acquires the captured image data stored in S825. In S830, the image processing apparatus 403 performs matching processing. In S831, the image processing apparatus 403 transmits matching processing performance result data to the operation terminal 405.

In S832, the operation terminal 405 performs display processing for checking the matching processing performance result generated based on the matching processing performance result data transmitted from the image processing apparatus 403. In S833 and S834, the image processing apparatus 403 stores the matching processing performance result data and the setting parameter for performing matching in the data acquisition/storage unit 511.

<Flowchart of Inspection Process Using Image Processing>

Figure 9:
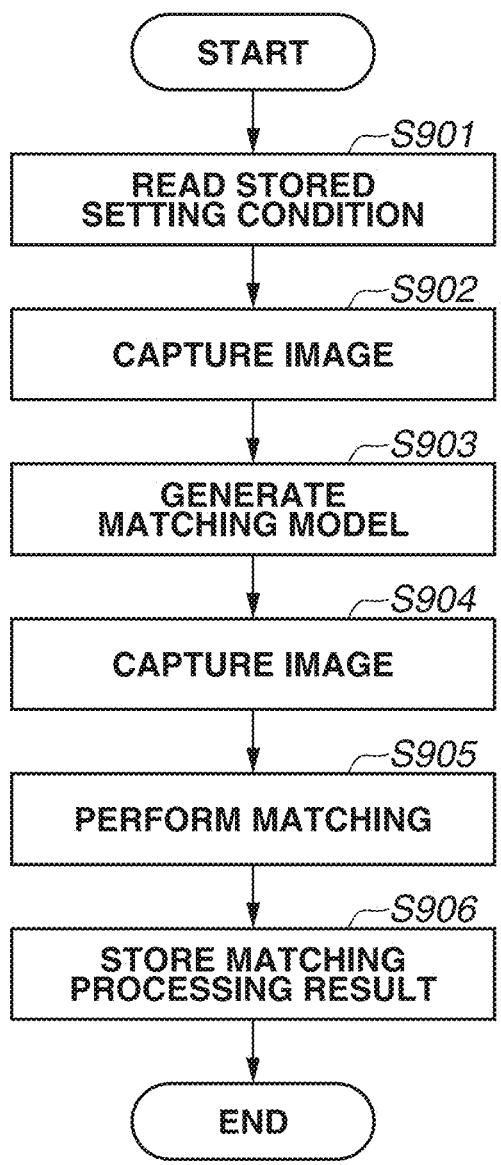
FIG. 9 is a flowchart illustrating an inspection process using image processing according to the first exemplary embodiment.

FIG. 9 is a flowchart illustrating a process of performing image processing according to the present exemplary embodiment.

The image processing apparatus 403 starts performing image processing and matching based on a request received from the operation terminal 405.

In S901, the image processing apparatus 403 acquires the parameter data for generating matching models and the setting condition for performing matching that are stored in S708 from the data acquisition/storage unit 511 to perform matching processing.

In S902, the image processing apparatus 403 performs image capturing processing for generating a matching model.

In S903, after acquiring image data output through the image capturing processing in S902 from the image capturing apparatus 401, the image processing apparatus 403 generates a matching model based on the acquired parameter data for generating matching models.

The matching processing is then performed using the matching model generated in S903. Specifically, the image processing apparatus 403 performs, in S904, image capturing processing on a matching target. In S905, after acquiring image data output through the image capturing processing in S904 from the image capturing apparatus 401, the image processing apparatus 403 performs matching processing based on the acquired setting condition parameter data for performing matching.

Lastly, in S906, the image processing apparatus 403 stores the performed matching processing result in the data acquisition/storage unit 511.

<Setting Item UI for Generating Matching Models>

A specific example of setting items for generating matching models (S903) will now be described.

Figure 10A:
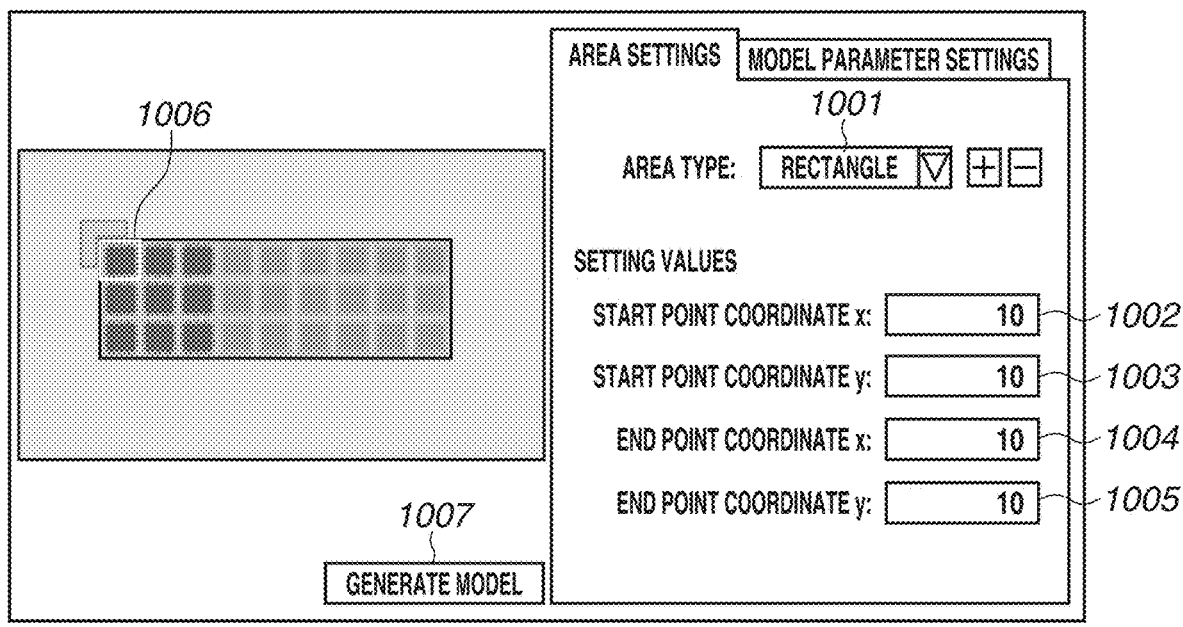
FIGS. 10A and 10B are diagrams illustrating settings for matching model generation according to the first exemplary embodiment.

First, an area setting is performed for designating a target for which a matching model is to be generated. As illustrated in FIG. 10A, an area type 1001 for designating a shape for setting an area is set, and coordinates 1002 to 1005 of four points are set in a case where the area type 1001 is, for example, rectangle. The coordinates 1002 to 1005 of four points can also be set by operating or changing a rectangle 1006 on a UI.

Figure 10B:
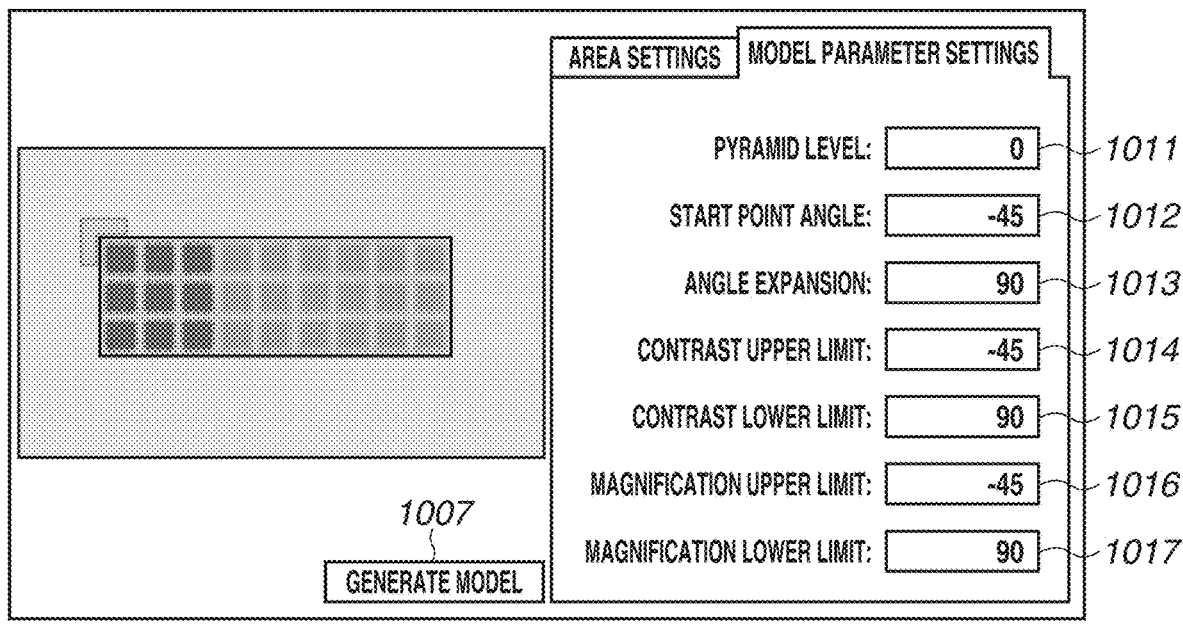

As illustrated in FIG. 10B, there are other parameters 1011 to 1017 for generating matching models. The other parameters 1011 to 1017 include, for example, parameters for setting an upper limit 1014 and a lower limit 1015 of contrast for detection. The operator 104 sets the setting values within minimum and maximum values using the UI and generates matching models.

Thereafter, when a GENERATE MODEL button 1007 is pressed, the image processing apparatus 403 generates a matching model as in S801 to 5817 described above. At this time, the processing is performed such that a name and identification (ID) of the generated matching model are stored as information for identifying the generated matching model thereafter in association with time and date of the generation, generated images, and the parameters for the generation. Whether the matching model generated as described above is appropriate is inspected through the processing described above with reference to FIG. 7.

An area setting for generating a matching model will now be described with reference to FIG. 11A.

Figure 11A:
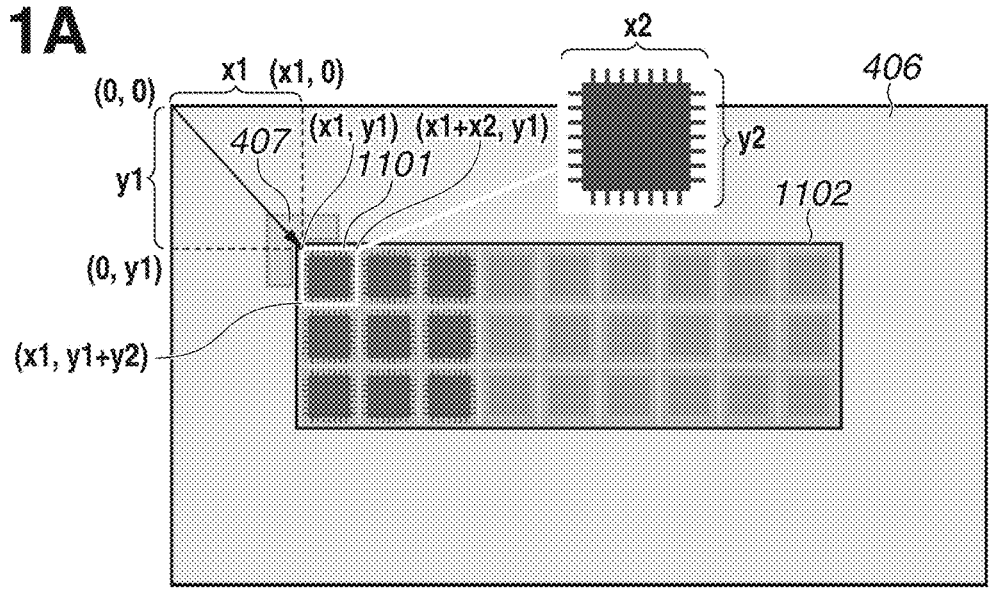
FIGS. 11A to 11C are diagrams illustrating settings for matching model generation according to the first exemplary embodiment.

In a case where an IC chip 1101 illustrated in FIG. 11A is to be set as a target for which a matching model is to be generated, an area is set as an area (x1, y1), (x1+x2, y1+y2). At this time, the coordinates of the area are coordinates with respect to an operation table 406, and the position of an IC chip tray 1102 is arranged and fixed in contact with an IC chip tray fixing device 407 by the operator 104. Thus, coordinates for generating a matching model for the IC chip 1101 stored in the IC chip tray 1102 are set to the area (x1, y1), (x1+x2, y1+y2).

Figure 11B:
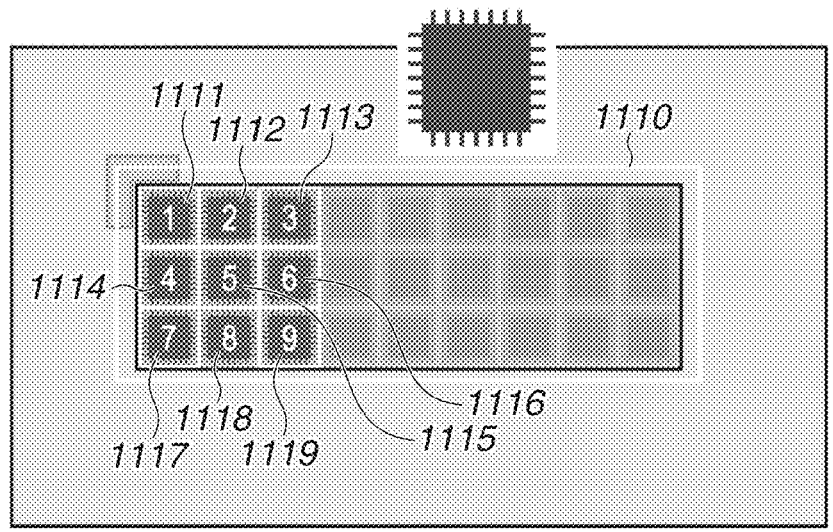

A matching model is thereby generated using the set area. An area 1110 illustrated in FIG. 11B is then designated as a matching processing target range using the matching model, and the matching processing is performed. As a result, the number of detected targets is nine as illustrated by IC chips 1111 to 1119. Furthermore, if information for recognizing the top, bottom, right, left of each IC chip is available, orientations are also checkable.

Figure 11C:
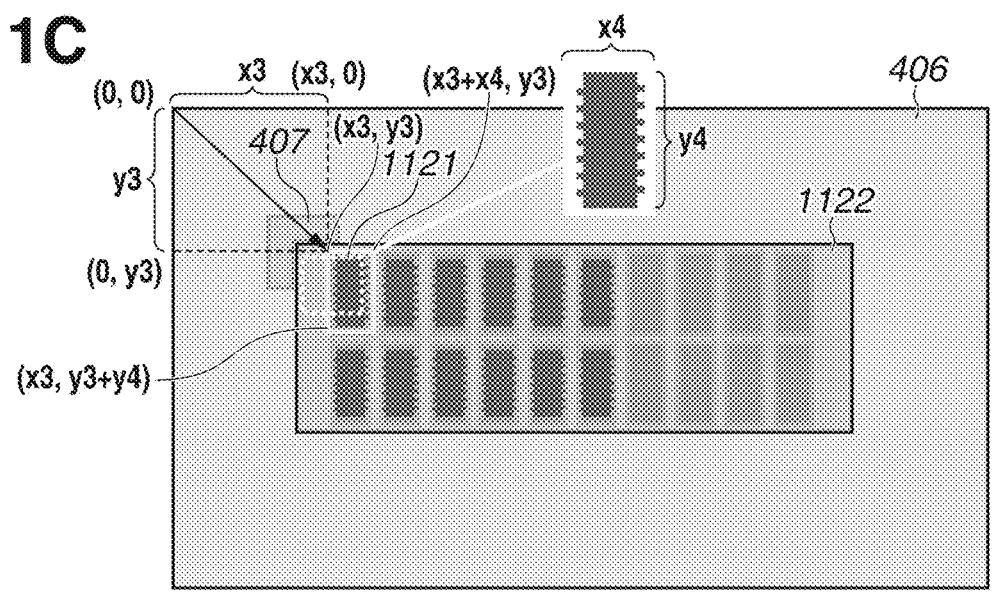

In a case where a matching model is to be generated for IC chips illustrated in FIG. 11C, an area (x3, y3), (x3+x4, y3+y4) is set.

This setting is different from the IC chip area (x1, y1), (x1+x2, y1+y2) illustrated in FIG. 11A. As described above, the parameters for generating matching models (e.g., the upper and lower limit values of contrast) can be the same for the IC chips illustrated in FIGS. 11A and 11C. However, different areas for which a matching model is to be generated need to be set for different types of IC chips.

Figure 12A:
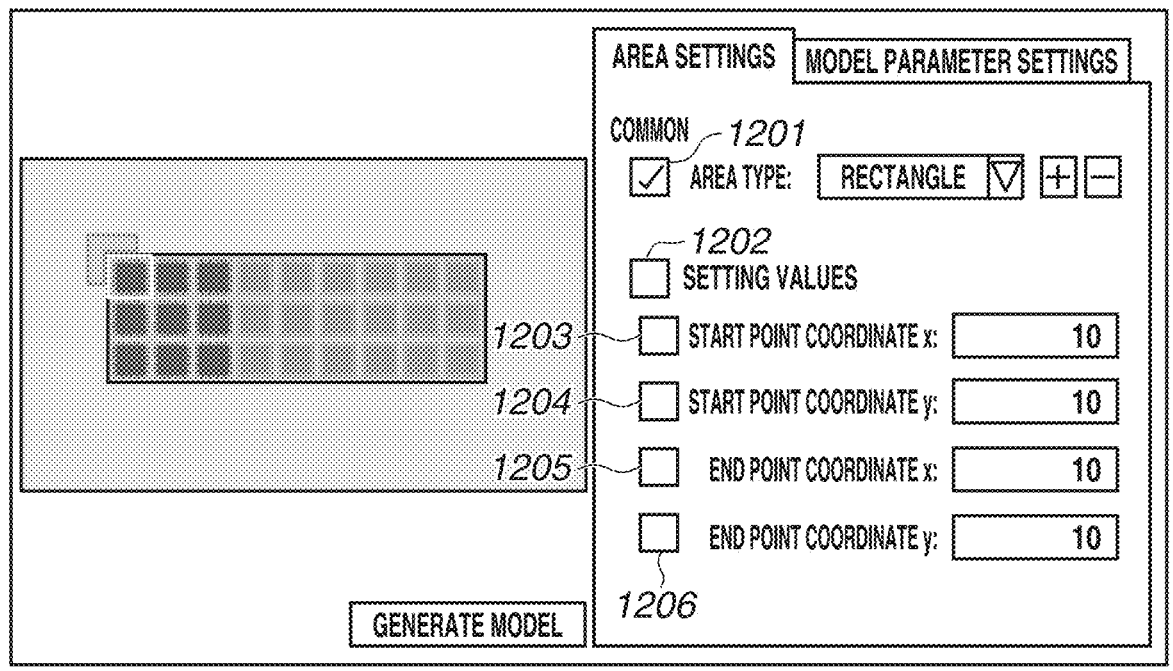
FIGS. 12A and 12B are diagrams illustrating settings for matching model generation according to the first exemplary embodiment.

Thus, the parameters to be set in generating a matching model are divided into items of parameters that can be used for different IC chips and items of parameters that cannot, and the former and the latter are set differently. Specifically, as illustrated in FIG. 12A, check states of checkboxes 1201 to 1206 are configured to be changeable in generating a matching model. A check is entered into each of the checkboxes 1201 to 1206 that corresponds to a parameter (common parameter) to be used for different IC chips. In contrast, no check is entered into the checkboxes 1201 to 1206 that correspond to a parameter (individual parameter) to be used for different IC chips (i.e., a parameter for which different values are to be set for different IC chips in generating a matching model). Information about whether a check is entered is stored as parameter data for generating matching models.

Figure 12B:
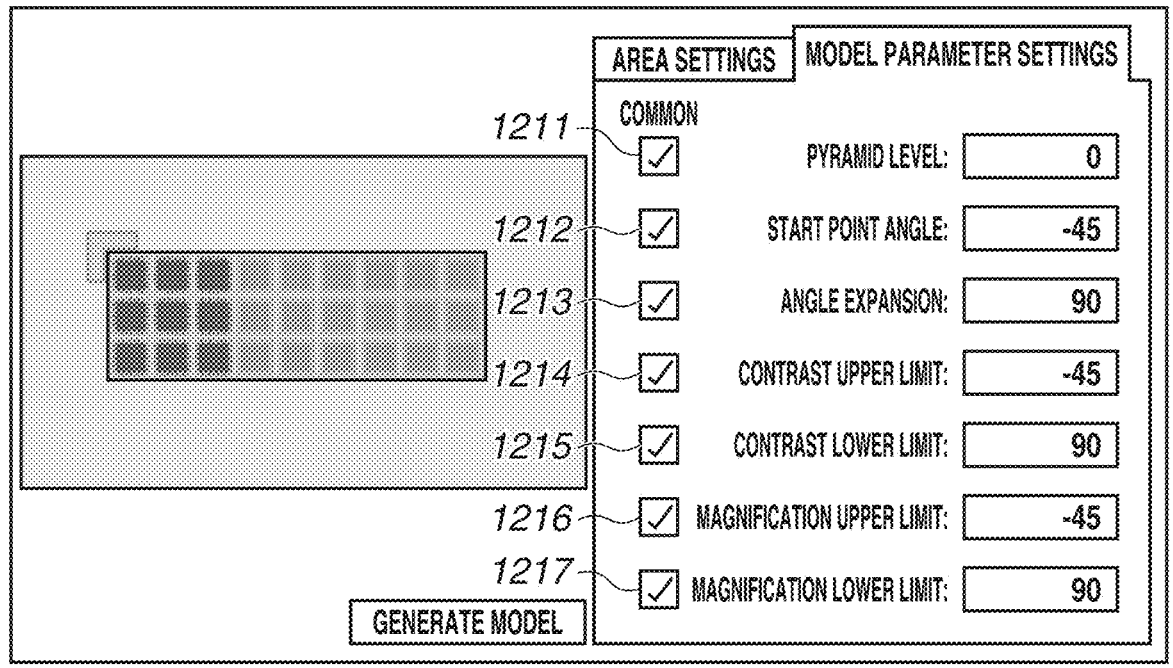

A check is entered in the checkbox 1201 in FIG. 12A and checks are entered in checkboxes 1211 to 1217 in FIG. 12B, so that the items corresponding to the checkboxes 1201 and 1211 to 1217 are stored as common parameters for common use. The other parameters are stored as individual parameters to be set individually for each IC chip type. Since the common parameters for common use are used in generating matching models for a plurality of types of IC chips, parameter values that are set are also stored.

As described above, according to the present exemplary embodiment, in a case where there are a large variety of types of IC chips for which a matching model is to be generated, the setting of whether a parameter is an item of a parameter to be set individually for each IC chip type is set by an operation on the UI and the set setting is stored by an operation on the UI. A process of setting a parameter as a parameter to be set individually for each IC chip type or as a parameter not to be set individually for each IC chip type by an operation on the UI as described above is performed in S701 in FIG. 7 described above.

Figure 13:
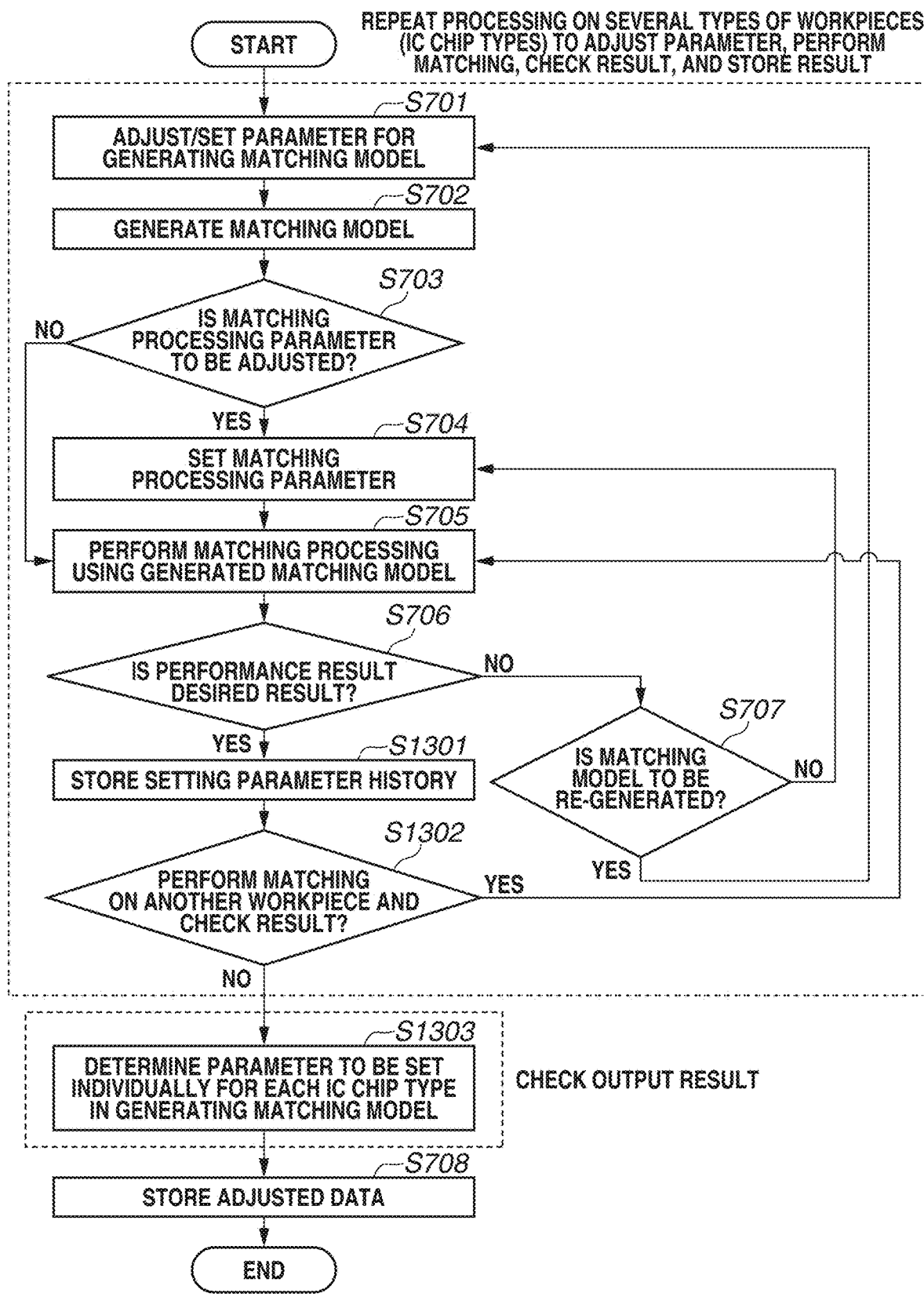
FIG. 13 is a flowchart illustrating a process of determining a parameter that is to be set individually for each IC chip type according to the first exemplary embodiment.

A method for setting an item of a parameter to be set individually for each IC chip type and an item of a parameter for common use via the UI as described above with reference to FIGS. 12A and 12B in generating a matching model will be described with reference to FIG. 13.

S701 to S707 of generating a matching model are similar to those illustrated in FIG. 7. In S701 to S707 and S1301, the process from the matching model generation to the performance of the matching processing for checking the result is repeated to check a plurality of types of combinations of an IC chip for which a matching model is to be generated and an IC chip tray for the IC chip (YES in S1302). During the process, in S1301, a history of adjusted setting parameters for generating matching models is stored. After the repeated process of performance, adjustment, and checking is completed (NO in S1302), the processing proceeds to S1303. In S1303, the image processing apparatus 403 refers to the history of setting parameters for generating matching models that is stored in S1301 and checks a history of changes (i.e., changes in value of each parameter).

Specifically, the parameters in the history are divided into parameters with an amount of change having reached a preset threshold value (i.e., parameters with a great amount of change) and parameters with an amount of change not having reached the present threshold value (i.e., parameters with a small amount of change or with no change), and the results are reflected to the presence/absence of a check in the parameter settings in FIGS. 12A and 12B described above. This enables the user generating matching models to recognize the change levels of the parameters for generating matching models for a plurality of IC chips for which a matching model is to be generated. Specifically, recommended values for the parameters to be set individually and recommended values for the parameters not to be set individually are determined for each IC chip type in generating a matching model in the cases to which the present exemplary embodiment is applied. Finally the user can check values of the checkboxes on the UI and determine a value by entering or clearing a check by a user operation.

Lastly, in S708, the image processing apparatus 403 stores the setting values determined in S1303 in the data acquisition/storage unit 511.

As described above, in order to perform matching processing on a plurality of types of IC chips and to check the number and orientations of the IC chips, it is desirable to generate a matching model each time for each IC chip of a different type and to perform matching using the generated matching model. Furthermore, the process is described above of identifying whether the parameters are parameters to be set individually for each of different types of IC chips for which a matching model is to be generated and of storing the information.

A method by which a parameter to be set individually for each IC chip type that is determined and stored in S1303 and S708 described above is set during the matching processing in an actual inspection process will be described below with reference to FIG. 14A.

A flow of the inspection process will now be described with reference to FIG. 9 described above. A process of setting a parameter to be set individually for each IC chip type described below is performed in S903 in FIG. 9.

In FIG. 9, the image processing apparatus 403 starts matching processing based on a request from the operation terminal 405, and the matching model generation processing is performed after execution in S901 and S902. The image processing apparatus 403 acquires parameter data for generating matching models from the data acquisition/storage unit 511. The image processing apparatus 403 divides the parameters for generating matching models into parameters to be set individually for each type of IC chips for which a matching model is to be generated and parameters not to be set individually for each IC chip type. The image processing apparatus 403 transmits the data to the operation terminal 405. The operation terminal 405 displays a setting screen (FIG. 14A) for the parameters received from the image processing apparatus 403, the parameters for which a matching model is to be generated and the parameters to be set individually for each IC chip type among the parameters for which a matching model is to be generated. Specifically, for the parameters to be set individually for each IC chip type, the user can change and move coordinates by operating an area 1401 displayed on the UI using a cursor 1402. A UI via which values 1403 to 1406 of the area coordinates are settable is also displayed, and the user can set the values 1403 to 1406. The area 1401 and the values 1403 to 1406 of the area coordinates are displayed such that the UI coordinates and the values always correspond.

Meanwhile, the parameters that are not to be set individually for each IC chip type and for which a matching model is to be generated are displayed such that the parameters are unchangeable (item 1407).

As described above, the user can perform an operation to set the parameters that are to be set individually for each IC chip type and for which a matching model is to be generated in the inspection process through the processing by the image processing apparatus 403 and the operation terminal 405.

Initial setting values of the displayed parameters in FIG. 14A that are to be set individually for each IC chip type and for which a matching model is to be generated will now be described. In FIG. 14A described above, preset fixed values are expected to be used as initial setting values. In this case, however, the user operation is always needed to set the parameters that are to be set individually for each IC chip type and for which a matching model is to be generated to a desired value.

In another example, specific image processing (e.g., image processing to detect an area corresponding to contrast values in a preset range) is performed and initial setting values are determined based on the detection result before the matching model generation processing in S903 in FIG. 9. Specifically, in FIG. 14B, coordinates of an area 1411 having the smallest x- and y-coordinates among the detected IC chips 1411 to 1419 are acquired, and the acquired coordinates are used as initial setting values of the area 1401 of FIG. 14A. Thus, an area close to an area of IC chips for which a matching model is to be generated is set as initial setting values (recommended values), and an area adjustment operation performed thereafter by the user can be minimized.

Figure 14A:
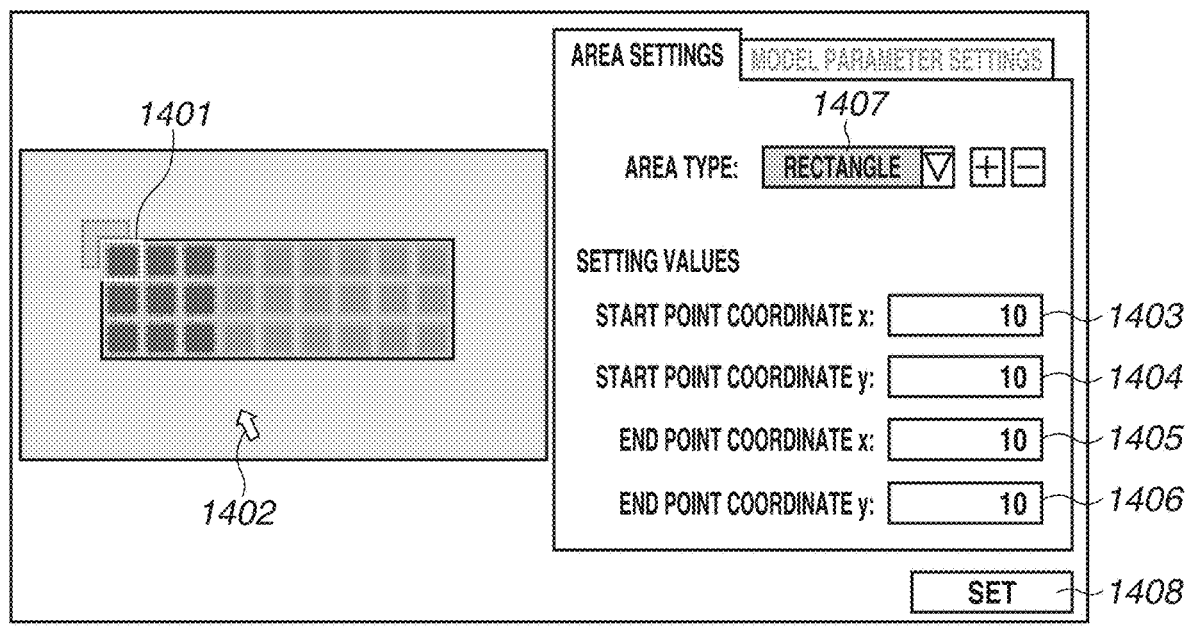
FIGS. 14A to 14C are diagrams illustrating settings for matching model generation according to the first exemplary embodiment.
Figure 14B:
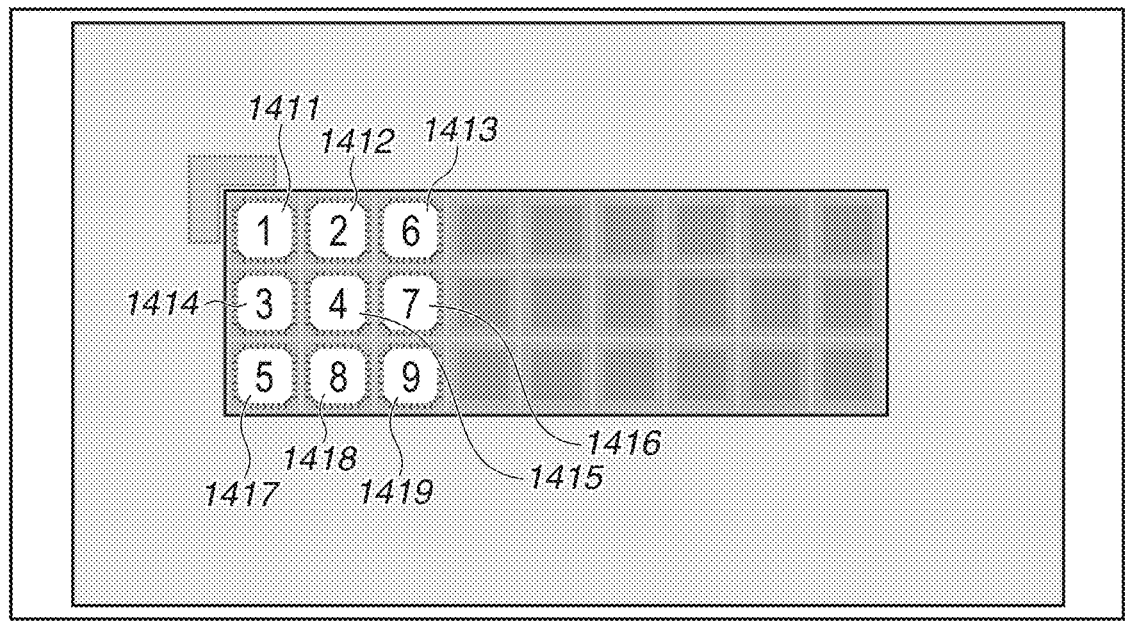
Figure 14C:
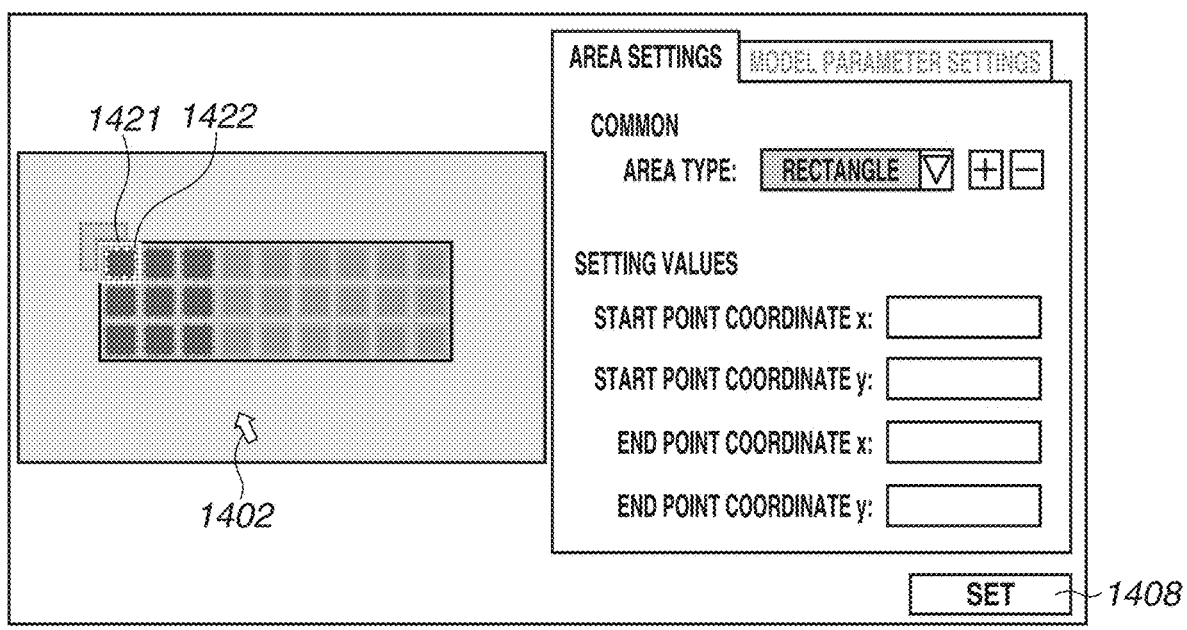

For the displayed parameters in FIG. 14A that are to be set individually for each IC chip type and for which a matching model is to be generated as described above, a plurality of displays of initial setting values can be implemented. A plurality of areas, such as areas 1421 and 1422 in FIG. 14C, can also be displayed. In this case, if the user selects one of the areas 1421 and 1422 (e.g., if the user starts an operation to first change or move the coordinates of the area 1422 using the cursor 1402), the display of the other area 1421 can be hidden.

As described above, the user sets the parameters to be set individually for each IC chip and for which a matching model is to be generated in the inspection process through the processing by the image processing apparatus 403 and the operation terminal 405, and the values are set by pressing a SET button 1408. A matching model is generated using the set area, and S904 and subsequent operations in the flowchart in FIG. 9 are performed, and the matching processing is performed.

As a result, an image processing apparatus configured to generate a matching model for a workpiece type is realized while reducing a matching model generation load in a use case where matching processing is to be performed on a large amount of workpieces that are similar to each other yet different from each other according to the present exemplary embodiment.

As described above in the first exemplary embodiment, the parameters to be set individually for each IC chip type are set in S903 of generating a matching model each time a single workpiece (IC chip) is inspected in the inspection process illustrated in FIG. 9. Specifically, the user determines the parameters by selecting and operating a UI displayed on the operation terminal 405 based on values output from the image processing apparatus 403.

The user selection and operation are desirably a minimum operation. A method for minimizing the user selection and operation in setting the parameters to be set individually for each IC chip type according to the present exemplary embodiment will be described below.

Figure 15:
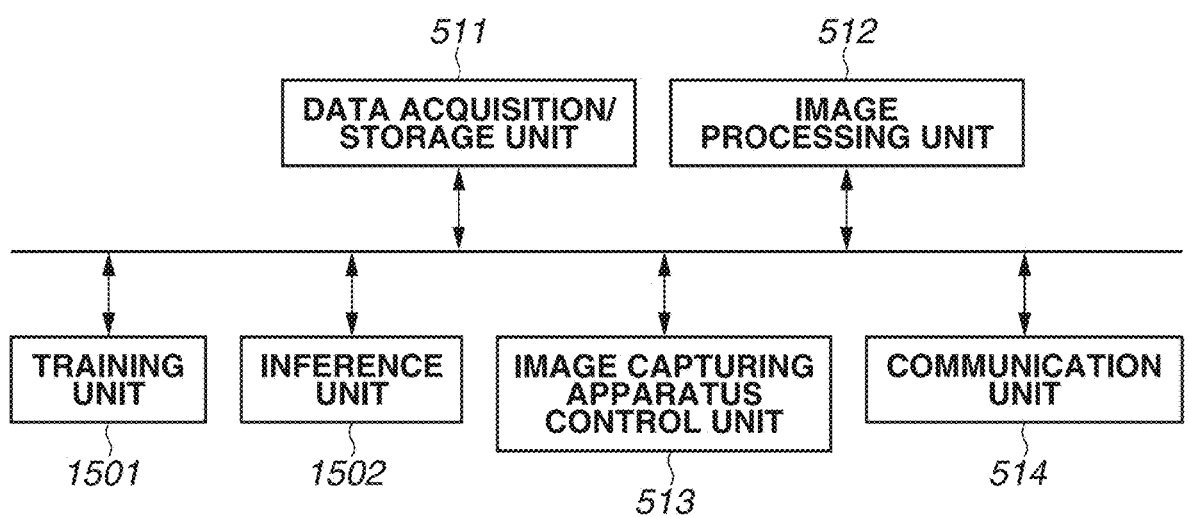
FIG. 15 is a diagram illustrating a software configuration of an apparatus according to a second exemplary embodiment.

FIG. 15 is a block diagram illustrating a software configuration of the image processing apparatus 403 according to a second exemplary embodiment.

The software configuration of the image processing apparatus 403 includes processing modules, such as the communication unit 514, the data acquisition/storage unit 511, the image processing unit 512, the image capturing apparatus control unit 513, a training unit 1501, and an inference unit 1502.

Operations of the communication unit 514, the data acquisition/storage unit 511, the image processing unit 512, and the image capturing apparatus control unit 513 are similar to those according to the first exemplary embodiment.

The training unit 1501 generates trained model data for inferring an area of IC chips for which a matching model is to be generated based on data for training that consists of images and information about an area of IC chips for which a matching model is to be generated.

The inference unit 1502 acquires captured image data and determines an area of IC chips for which a matching model is to be generated as described below.

Figure 16:
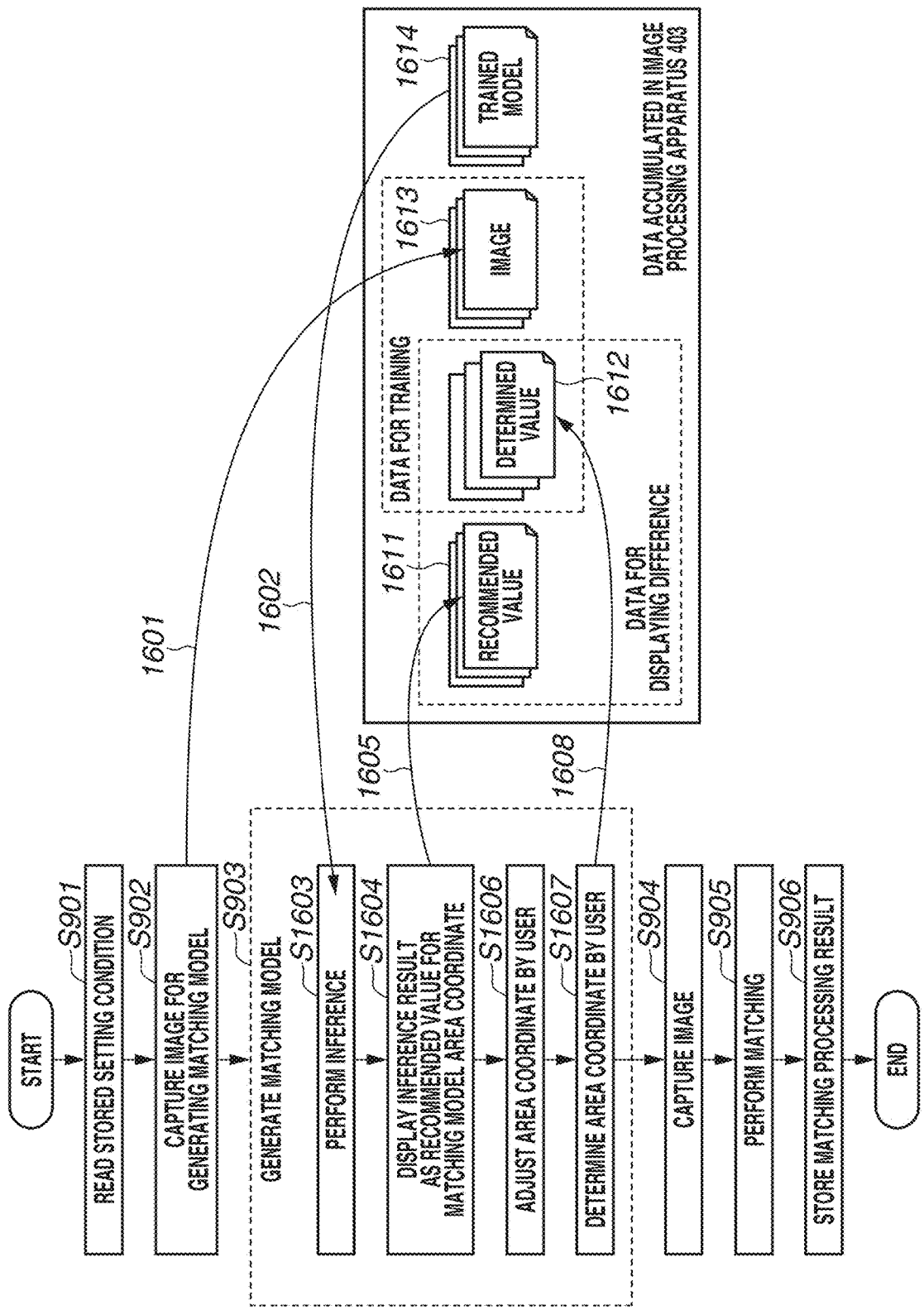
FIG. 16 is a flowchart illustrating a matching model generation process according to the second exemplary embodiment.

A process of accumulating determined area coordinate values for generating matching models as data for training, learning the values, and applying an inferred value to a recommended value for area coordinates for generating a matching model will be described below with reference to FIG. 16. In S901, the image processing apparatus 403 acquires the setting values for generating matching models and for performing matching that are adjusted by the user in the setting process based on a request from the operation terminal 405 in the inspection process according to the present disclosure. In S902, the image processing apparatus 403 performs image capturing processing for generating a matching model. At this time, in S1601, captured image data for generating a matching model is stored and accumulated in the data acquisition/storage unit 511 (image 1613). The stored and accumulated data is used as data for training by the training unit 1501 of the image processing apparatus 403.

In S903, the image processing apparatus 403 performs matching model generation processing. S1602 to S1608 are performed during the matching model generation processing in S903.

Specifically, a trained model 1614 for performing the inference that is performed by the inference unit 1502 of the image processing apparatus 403 is acquired. In S1603, the inference unit 1502 of the image processing apparatus 403 performs inference on the image data captured in S902 using the acquired trained model 1614. In S1604, the image processing apparatus 403 applies a value output through the performed inference as a recommended value for area coordinates for generating a matching model and transmits the recommended value to the operation terminal 405, and the operation terminal 405 displays the recommended value for area coordinate on the UI. In a case where there is no trained model 1614, the inference is not performed, and the initial setting values described above with reference to FIGS. 14A, 14B, and 14C according to the first exemplary embodiment are applied to recommended values for area coordinates for a matching model that are displayed in S1604. In S1605, the recommended values for the area coordinates for a matching model that are output from the image processing apparatus 403 are stored in the data acquisition/storage unit 511 (image 1611). As described below, the recommended values are stored for use by the image processing apparatus 403 in calculating a difference between the recommended values and the area coordinates for generating a matching model that are finally determined by the user.

In S1606, the user checks the recommended values for the area coordinates for a matching model that are displayed in S1604 and the images captured in S902 and adjusts the area for generating a matching model. In S1607, after completing the adjustment operation in S1606, the user determines an area setting for generating a matching model. In S1608, the image processing apparatus 403 stores and accumulates the determined coordinate values of the area for generating a matching model in the data acquisition/storage unit 511 (image 1612). At this time, the determined values of the area coordinates for generating a matching model that are stored and accumulated are stored in association with the recommended values. As described below, the determined values are stored for use by the image processing apparatus 403 in calculating a difference between the recommended values and the area coordinates for generating a matching model that are finally determined by the user.

Subsequent S904 to S906 are similar to those in the inspection process described above with reference to FIG. 9 according to the first exemplary embodiment.

Figure 17:
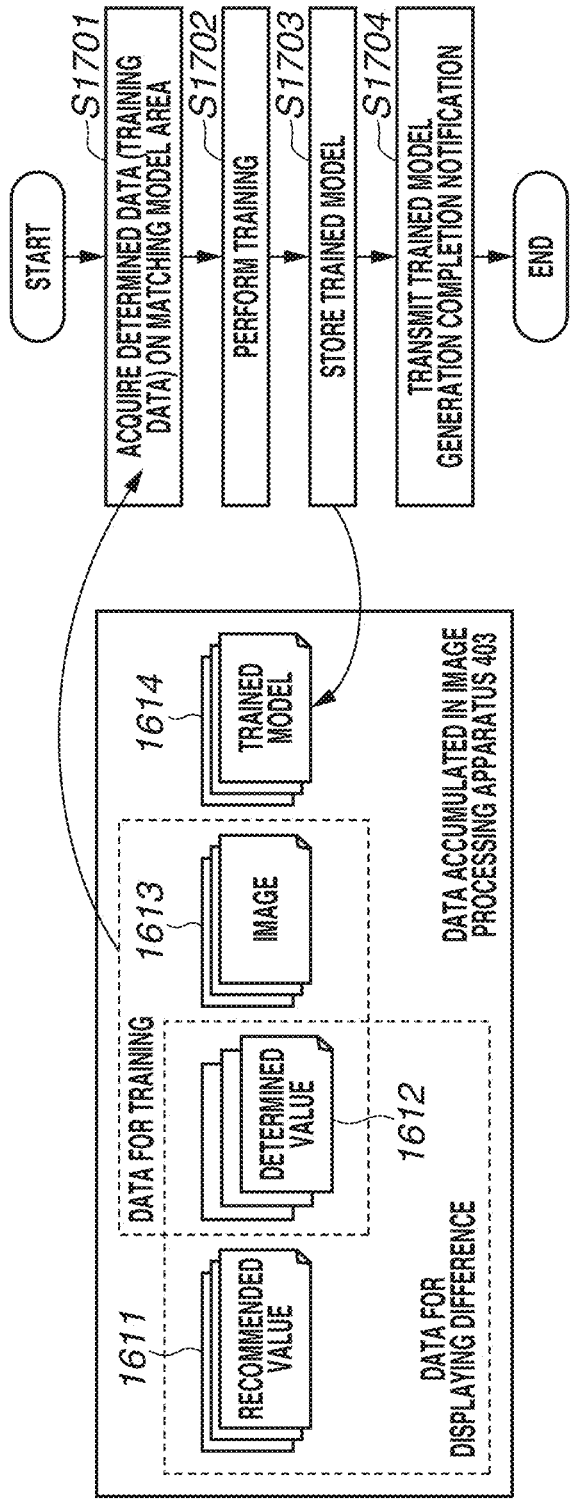
FIG. 17 is a flowchart illustrating a trained model data generation process according to the second exemplary embodiment.

FIG. 17 is a flowchart illustrating a process of generating trained model data that is performed by the training unit 1501.

In S1701, the image processing apparatus 403 acquires the determined values of the area coordinate for generating a matching model that are stored in S1607 and the captured image data stored in S1613 from the data acquisition/storage unit 511. A target for the determined values of the area coordinates for generating a matching model that are acquired herein is data (newest unprocessed data since the previous time) that is not a target in previous training processing by the training unit 1501 of the image processing apparatus 403.

In S1702, the training unit 1501 of the image processing apparatus 403 performs training processing using the data acquired in S1701 to reflect the acquired data to the previously-generated trained model data.

In S1703, the training unit 1501 of the image processing apparatus 403 generates, after completing the training processing, trained model data and stores the generated trained model data in the data acquisition/storage unit 511 (trained model 1614). At this time, the trained model data is stored in a form that is uniquely identifiable (the data is named based on an operation flow type, time/date information, and/or content of training target data). In S1704, the training unit 1501 of the image processing apparatus 403 notifies, after completing the storage of the trained model data, the operation terminal 405 that the generation and storage of the trained model data is completed. From the trained model data generation and storage completion notification to the operation terminal 405, the user recognizes that the inference described below can be performed using new trained model data.

Since it takes some time to complete the trained model data generation processing, the processing can be started automatically at fixed time after daily operation ends, or the trained model data generation processing can be started based on a start instruction from the user.

Figure 18:
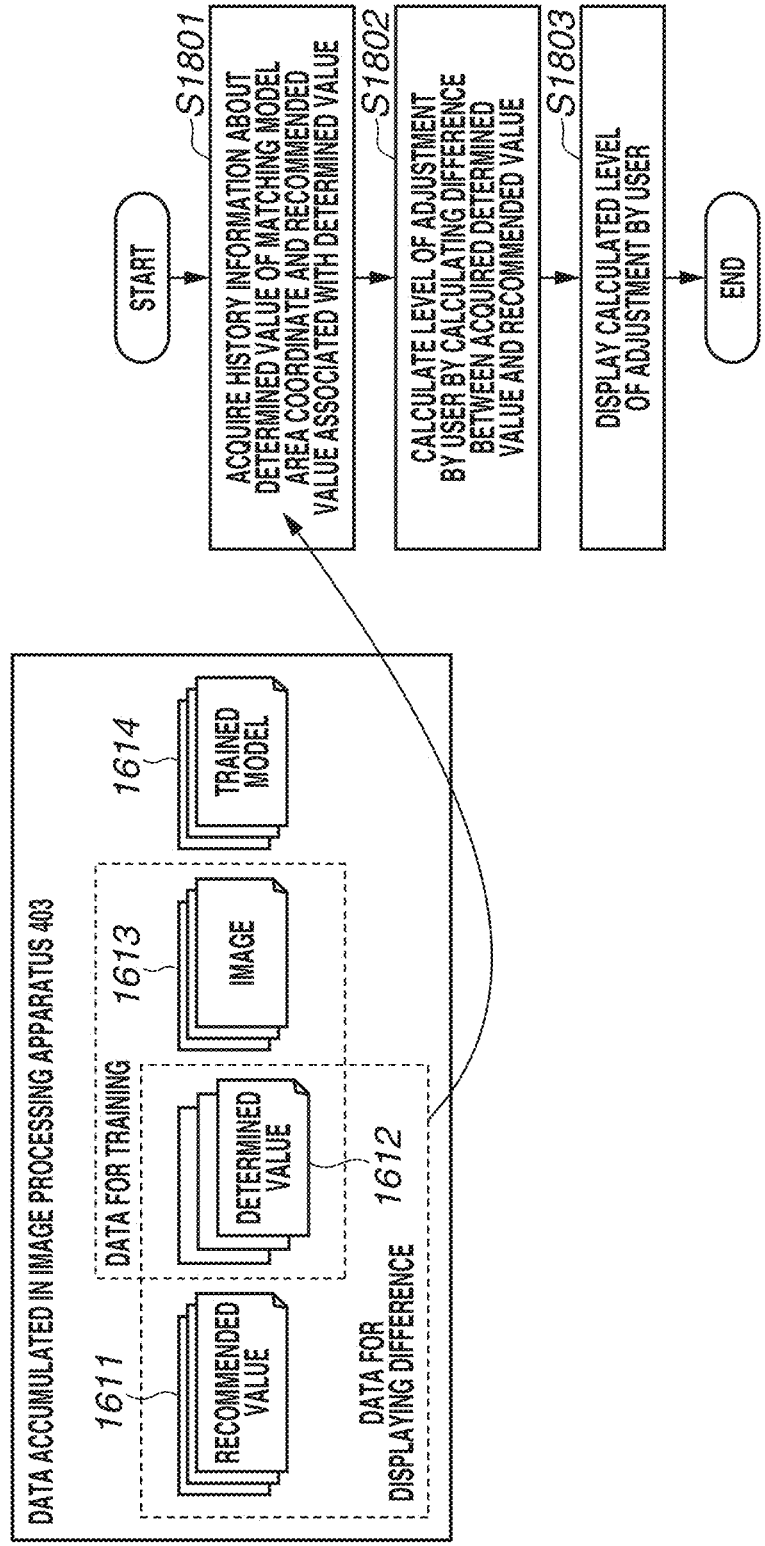
FIG. 18 is a flowchart illustrating a difference calculation process according to the second exemplary embodiment.

FIG. 18 is a flowchart illustrating a process of calculating a difference between recommended values output through the inference and displayed by the inference unit 1502 of the image processing apparatus 403 and area coordinates for generating a matching model that are finally determined by the user.

In S1801, the image processing apparatus 403 acquires the area coordinate values 1612 stored in S1608 and the recommended values 1611 for the area coordinates for generating a matching model that are stored in association with the area coordinate values 1612 from the data acquisition/storage unit 511. In S1802, the image processing apparatus 403 calculates the difference between the acquired data. The calculated difference value indicates an adjustment level of adjustment made by the user from the recommended values. In S1803, the image processing apparatus 403 transmits the calculated difference value data to the operation terminal 405, and the operation terminal 405 displays temporal changes in the adjustment level of adjustment made by the user based on the difference value data and the information associated with the difference value data.

Figure 19:
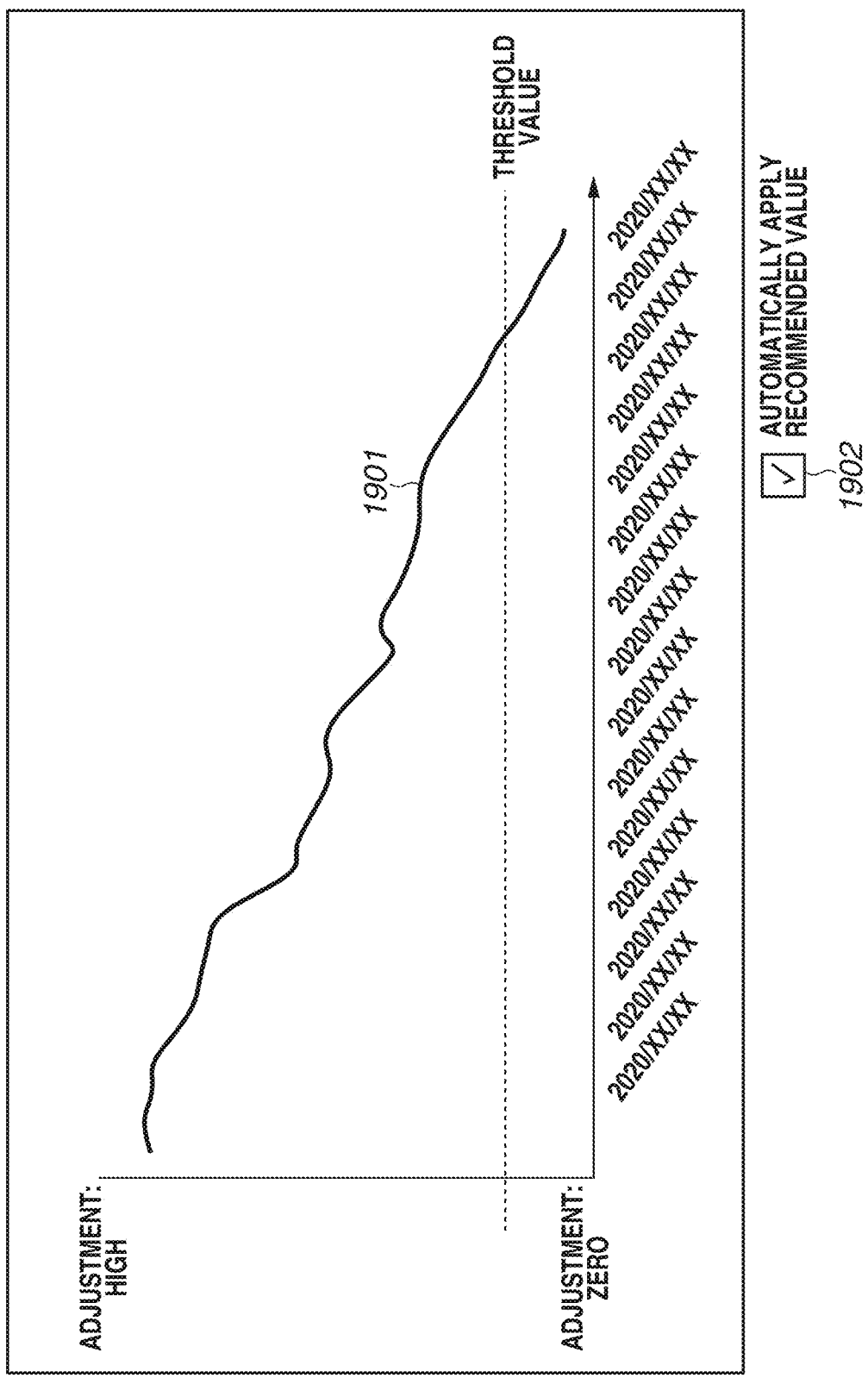
FIG. 19 illustrates an example of a display of a temporal change in difference according to the second exemplary embodiment.

A display example of S1803 is illustrated in FIG. 19.

A checkbox 1902 is a UI for selecting whether to apply the calculated recommended values automatically (without checking and determining operations by the user) to area coordinates for generating a matching model.

In a case where a check is entered in the checkbox 1902, the user operations of adjusting and determining area coordinates for generating matching models according to the first and second exemplary embodiments are omitted. Specifically, in a case where an adjustment made by the user on the UI from an area coordinate for generating a matching model that is specified as a recommended value is within an allowable range (less than or equal to a threshold value) as illustrated in FIG. 19, the recommended value is used as a determined value without adjustment, and the matching model generation processing is performed.

FIG. 19 illustrates an example where an adjustment made by the user from an area coordinate specified as a recommended value on the UI is within the allowable range (less than or equal to the threshold value) (e.g., the difference between the recommended value output through the inference and the determined value of the area coordinate that is finally determined by the user converges over time). However, there may be a case where the foregoing result is not obtained and the difference does not converge but rather diverges over time.

This case is against the reduction of the amount of user operation that is an object of the present exemplary embodiment. Thus, the user is to be notified that a method according to the present exemplary embodiment is not acting effectively.

Specifically, the image processing apparatus 403 detects a possibility that a temporal change 1901 illustrated in FIG. 19 will not reach an expected adjustment amount within a predetermined time period and notifies the operation terminal 405 about the possibility so that this is displayed on the UI. The predetermined time period and the expected adjustment amount can be preset by the user, or the image processing apparatus 403 can include a unit including a convergence prediction program.

As described above, the second exemplary embodiment minimizes the user selection and operation in setting a parameter that is to be set individually for each IC chip type.

Some embodiments are also realized by performing the following processing. Specifically, software (program) for realizing the functions of the above-described exemplary embodiments is supplied to a system or an apparatus via a network or various storage mediums, and a computer (or a CPU or a micro-processing unit (MPU)) of the system or the apparatus reads the program and executes the read program.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-065654, which was filed on Apr. 8, 2021 and which is hereby incorporated by reference herein in its entirety.

What is claimed is:

1. An image processing apparatus system which inspects whether a number and orientations of a plurality of integrated circuit (IC) chips packed in an IC chip tray are correct by using a plurality of matching models, the image processing system comprising:
at least one memory; and
at least one processor configured to perform operations comprising:
acquiring a captured image;
setting a plurality of parameters for generating the plurality of matching models;
generating the plurality of matching models for detecting the plurality of IC chips based on the acquired captured image and the set plurality of parameters; and
identifying an item of a contrast for common use by the plurality of IC chips and an item of an area to be determined for each of the plurality of IC chips from the plurality of parameters in a case where the plurality of parameters is set and the plurality of matching models is generated for each of the plurality of IC chips,
wherein the item of the area is set in generating the plurality of matching models, and
wherein the plurality of matching models are generated based on the item of the contrast stored in advance and the item of the area set.

2. The image processing system according to claim 1, wherein the item of the contrast and the item of the area are able to be changed.

3. The image processing system according to claim 1, wherein a value of the area is set to an initial setting value, and the value of the area is able to be changed based on a user operation.

4. The image processing system according to claim 1, wherein a value of the area is set based on a result of image processing on the captured image in generating the plurality of matching models.

5. The image processing system according to claim 1, wherein the operations further comprise: displaying a setting screen for setting the plurality of parameters for the matching model generation, and performing display on the setting screen such that a value of the area is settable by a user operation.

6. The image processing system according to claim 1, wherein the operations further comprise: displaying a setting screen for setting the plurality of parameters for the matching model generation, and performing display on the setting screen such that a value of the contrast is not settable by a user operation.

7. A method for controlling an image processing system which inspects whether a number and orientations of a plurality of integrated circuit (IC) chips packed in an IC chip tray are correct by using a plurality of matching models, the method comprising:
acquiring a captured image;
setting a plurality of parameters for generating the plurality of matching models;
generating the plurality of matching models for detecting the plurality of IC chips based on the acquired captured image and the set plurality of parameters; and
identifying an item of a contrast for common use by the plurality of IC chips and an item of an area to be determined for each of the plurality of IC chips from the plurality of parameters in a case where the plurality of parameters is set and the plurality of matching models is generated for each of the plurality of IC chips,
wherein the item of the area is set in generating the plurality of matching models, and
wherein the plurality of matching models are generated based on the item of the contrast stored in advance and the item of the area set.

8. A non-transitory computer-readable storage medium storing a program for causing a computer to perform operations comprising:
inspecting whether a number and orientations of a plurality of integrated circuit (IC) chips packed in an IC chip tray are correct by using a plurality of matching models;
acquiring a captured image;
setting a plurality of parameters for generating the plurality of matching models;
generating the plurality of matching models for detecting the plurality of IC chips based on the acquired captured image and the set plurality of parameters; and
identifying an item of a contrast for common use by the plurality of IC chips and an item of an area to be determined for each of the plurality of IC chips from the plurality of parameters in a case where the plurality of parameters is set and the plurality of matching models is generated for each of the plurality of IC chips,
wherein the item of the area is set in generating the plurality of matching models, and
wherein the plurality of matching models are generated based on the item of the contrast stored in advance and the item of the area set.

\* \* \* \* \*